US007084878B2

(12) United States Patent
Herceg et al.

(10) Patent No.: US 7,084,878 B2
(45) Date of Patent: Aug. 1, 2006

(54) RENDERING PAGE DESCRIPTIONS

(75) Inventors: Marija Herceg, Lindfield (AU); Timothy Merrick Long, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 09/905,947

(22) Filed: Jul. 17, 2001

(65) Prior Publication Data

US 2002/0012132 A1    Jan. 31, 2002

(30) Foreign Application Priority Data

Jul. 28, 2000    (AU) .................................. PQ9058

(51) Int. Cl.
*G06T 9/00* (2006.01)
*G06T 1/60* (2006.01)
*G06F 3/12* (2006.01)

(52) U.S. Cl. .................. 345/555; 358/1.1; 345/530
(58) Field of Classification Search ................ 345/522, 345/553, 555, 545, 530, 501; 358/1.1, 450; 382/232
See application file for complete search history.

(56) References Cited

U.S. PATENT DOCUMENTS

| 5,680,521 A | * | 10/1997 | Pardo et al. | ............. | 358/1.13 |
| 5,708,763 A |   | 1/1998  | Peltzer      | ............. | 395/115  |
| 5,737,503 A | * | 4/1998  | Mitani       | ............. | 358/1.16 |
| 5,880,737 A | * | 3/1999  | Griffin et al. | ........... | 345/582  |
| 5,959,867 A | * | 9/1999  | Speciner et al. | ......... | 700/219  |
| 6,184,860 B1| * | 2/2001  | Yamakawa     | ............. | 715/823  |
| 6,330,072 B1| * | 12/2001 | Barada et al. | ............ | 358/1.18 |

FOREIGN PATENT DOCUMENTS

DE    37 29 023 A1    3/1988
WO    WO 01/01351 A1  1/2001

* cited by examiner

*Primary Examiner*—Kee M. Tung
*Assistant Examiner*—Joni Hsu
(74) *Attorney, Agent, or Firm*—Fitzpatrick, Cella, Harper & Scinto

(57) ABSTRACT

In rendering a page description on a rendering system, a method comprises the step of receiving objects and generating one or more sets of render instructions. For each received object it is first determined whether by adding the corresponding render instructions of a current received object to a current set of render instructions the resources of the rendering system will be exceeded. If the resources would be exceeded then a new set of render instructions are created, render instructions are added thereto to draw the current set of render instructions as a background image, and then the corresponding render instructions of the current received object are added to the new set. On the other hand, if the resources would not be exceeded then the corresponding render instructions of the current received object are added to the current set. Finally, the method renders the one or more sets of rendering instructions.

20 Claims, 19 Drawing Sheets

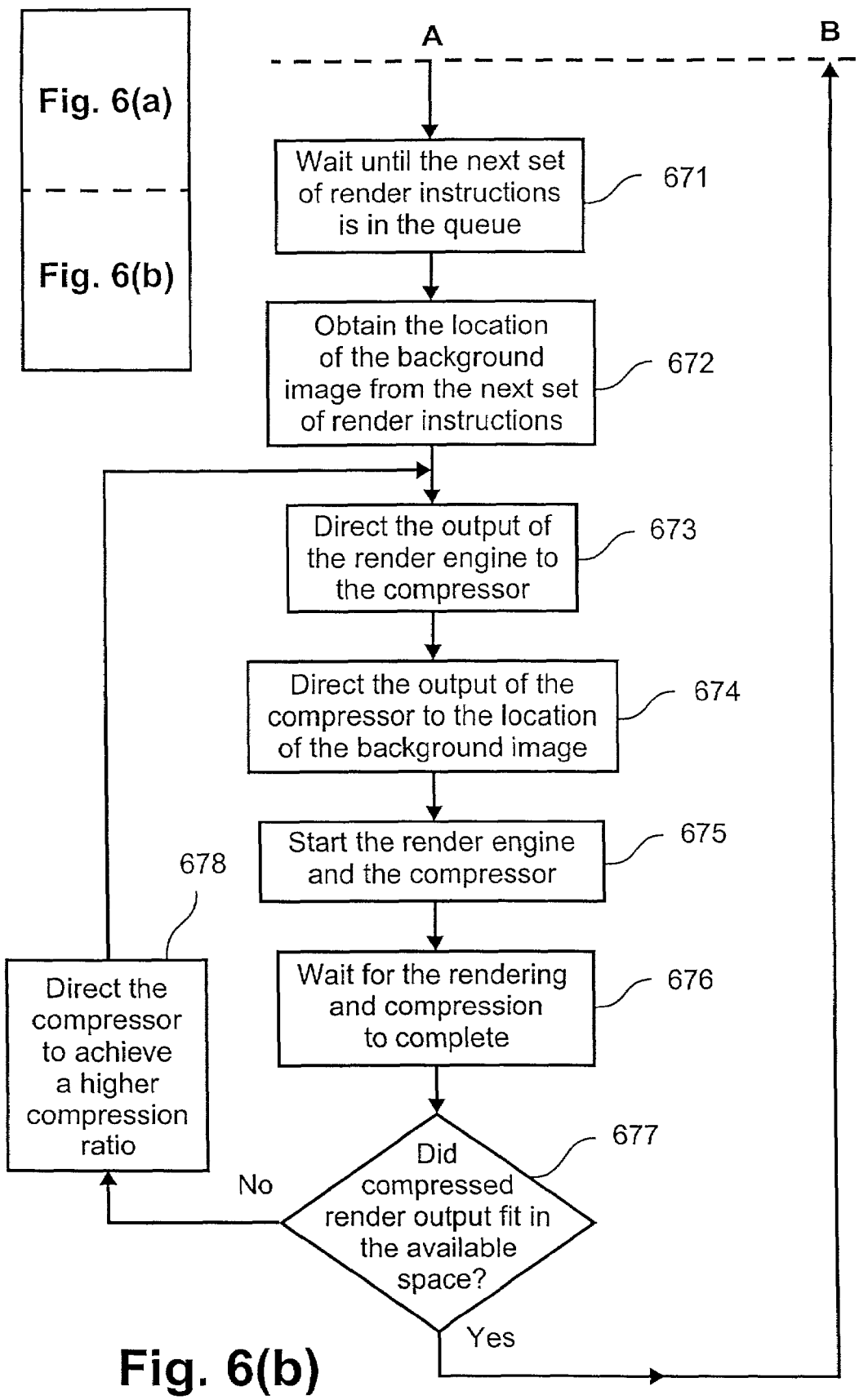

RENDERING PAGE DESCRIPTIONS

TECHNICAL FIELD OF THE INVENTION

The present invention relates to a method and system for rendering a page description. The invention also relates to a computer readable medium comprising a computer program for rendering a page description.

BACKGROUND

In relatively recent years, graphics packages have existed for rendering printed pages to printers, display screens, and/or other locations (eg. files). A number of these graphics packages typically utilise a high-level page description language for assisting in the layout of the printed pages. These graphics packages typically comprise a rendering system, which converts the high level page description of the page layout into pixels data that can be used as raster data to be printed and/or displayed.

One such rendering system comprises a full-page frame store to hold a pixel-based image of the page or screen. The full-page frame store is a buffer that has room for every pixel that needs to be sent to the printer for a whole page. In these systems, every object that is received in the high-level page description can be rendered immediately. The main problem with this system is the memory that is required for the frame store is very large, especially when each pixel is required to be continuous-tone colour, and may have an associated transparency value.

There exist rendering systems, which perform more efficiently in both speed and memory usage when applied to the render list as a whole rather than to objects sequentially in z-order. Such systems are highly advantageous when the storage required for the render-list is within available resources, but break down if more resources are required. For instance, the size of an object render-list is unbounded, whereas the size of a frame store, although large, is limited and is strictly dependent on the resolution and size of the printed page. When such systems are used they either fail when presented with a render-list that exceeds available resources, or degrade to an object-sequential immediate rendering method using a frame store.

SUMMARY OF THE INVENTION

It is an object of the present invention to substantially overcome, or at least ameliorate, one or more disadvantages of existing arrangements.

According to a first aspect of the invention, there is provided a method of rendering a page description on a rendering system, wherein said page description comprises one or more objects, the method comprising the steps of: receiving said objects sequentially in z-order from bottom to top; generating one or more sets of render instructions, wherein said generating step performs the following sub-steps for each received object: determining whether adding corresponding render instructions of a current said received object to a current set of render instructions will exceed the resources of the rendering system; and if the resources are exceeded performing the following sub-steps; creating a new set of render instructions; adding render instructions to the new set of render instructions to draw the current set of render instructions as a background image; and adding to the new set of render instructions the corresponding render instructions of said current received object; and if the resources are not exceeded performing the following sub-step: adding the corresponding render instructions of said current received object to the current set of instructions; and rendering said one or more sets of rendering instructions as pixel data.

According to a second aspect of the invention, there is provided a method of rendering a page description, wherein said page description comprises one or more objects, the method comprising the steps of: receiving said objects sequentially in z-order from bottom to top, wherein the method performs the following sub-steps for each said received object: testing if resources would be exceeded if the received object is added to a current render-list, and if it would, rendering said current render-list onto a frame store and then setting said current render-list to be empty; adding the received object to said current render-list; and if the received object is the last object in the z-order then: if said frame-store was rendered onto, rendering said current render-list in combination with said frame-store to form the rendered page description, else rendering said current render-list to form the rendered page description.

According to a third aspect of the invention, there is provided a system for rendering a page description, wherein said page description comprises one or more objects, the system comprising: means for receiving said objects sequentially in z-order from bottom to top; means for generating one or more sets of render instructions, wherein said generating means comprises: means for determining, for each received said object, whether adding corresponding render instructions of a current said received object to a current set of render instructions will exceed the resources of the rendering system; means for creating, if the resources are exceeded, a new set of render instructions; means for adding, if the resources are exceeded, render instructions to the new set of render instructions to draw the current set of render instructions as a background image; means for adding, if the resources are exceeded, to the new set of render instructions the corresponding render instructions of said current received object; means for adding, if the resources are not exceeded, the corresponding render instructions of said current received object to the current set of instructions; and means for rendering said one or more sets of rendering instructions as pixel data.

According to a fourth aspect of the invention, there is provided a system for rendering a page description, wherein said page description comprises one or more objects, the system comprising: means for receiving said objects sequentially in z-order from bottom to top; means for testing, for each received object, if resources would be exceeded if the received object is added to a current render-list, and if it would, rendering said current render-list onto a frame store and then setting said current render-list to be empty; means for adding the received object to said current render-list; means for rendering said current render-list in combination with said frame-store to form the rendered page description, if the received object is the last object in the z-order and said frame-store was rendered onto; and means for rendering said current render-list to form the rendered page description, if the received object is the last object in the z-order and said frame store was not rendered onto.

According to a fifth aspect of the invention, there is provided a computer readable medium comprising a computer program for rendering a page description, wherein said page description comprises one or more objects, the computer program comprising: code for receiving said objects sequentially in z-order from bottom to top; code for generating one or more sets of render instructions, wherein said generating code comprises: code for determining, for each received said object, whether adding corresponding render instructions of a current said received object to a current set of render instructions will exceed the resources of the rendering system; code for creating, if the resources are exceeded, a new set of render instructions; code for adding, if the resources are exceeded, render instructions to the new set of render instructions to draw the current set of render instructions as a background image; code for adding, if the resources are exceeded, to the new set of render instructions the corresponding render instructions of said current received object; code for adding, if the resources are not exceeded, the corresponding render instructions of said current received object to the current set of instructions; and code for rendering said one or more sets of rendering instructions as pixel data.

According to a sixth aspect of the invention, there is provided a computer readable medium comprising a computer program for rendering a page description, wherein said page description comprises one or more objects, the computer program comprising: code for receiving said objects sequentially in z-order from bottom to top; code for testing, for each received object, if resources would be exceeded if the received object is added to a current render-list, and if it would, rendering said current render-list onto a frame store and then setting said current render-list to be empty; code for adding the received object to said current render-list; code for rendering said current render-list in combination with said frame-store to form the rendered page description, if the received object is the last object in the z-order and said frame-store was rendered onto; and code for rendering said current render-list to form the rendered page description, if the received object is the last object in the z-order and said frame store was not rendered onto.

BRIEF DESCRIPTION OF THE DRAWINGS

A number of preferred embodiments of the present invention will now be described with reference to the drawings, in which:

FIGS. 6(a) and 6(b) show a flow chart of the procedure for loading the one or more sets of rendering instructions used by the render instruction loader of FIG. 1A;

DETAILED DESCRIPTION INCLUDING BEST MODE

Figure 1A:
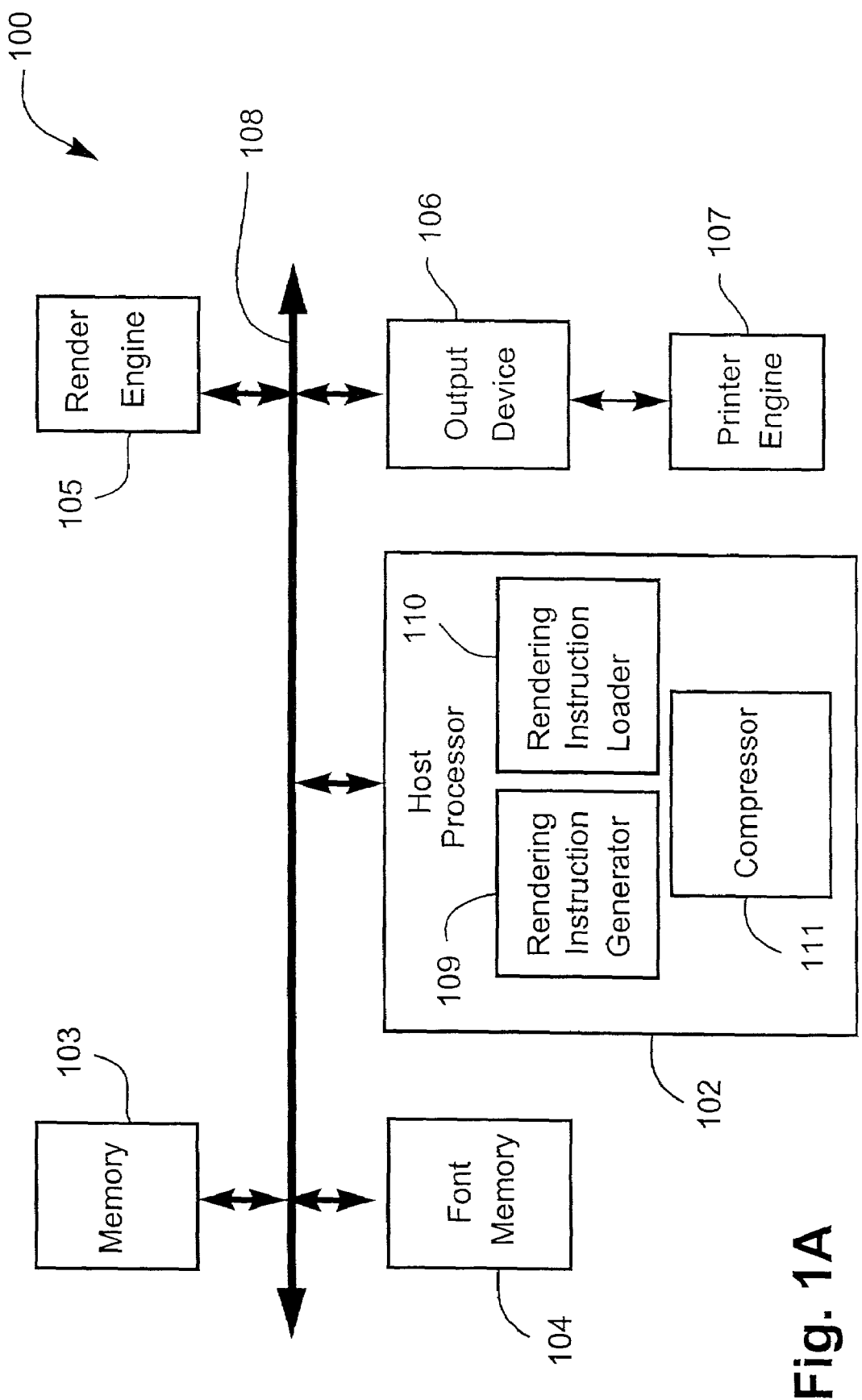
FIG. 1A is a schematic block diagram representation of a computer system for rendering a page description incorporating the preferred embodiment.

Where reference is made in any one or more of the accompanying drawings to steps and/or features, which have the same reference numerals, those steps and/or features have for the purposes of this description the same function(s) or operation(s), unless the contrary intention appears.

FIG. 1 illustrates a computer system 100 configured for rendering and presentation of a high-level page description into pixels that is used as raster data to be printed. The computer system 100 comprises a host processor 102 associated with system random access memory (RAM) 103, a font memory 104, a render engine 105, an output device 106, and a printer engine 107. The computer system 100 also comprises a rendering instruction generator software module 109, a rendering instruction loader software module 110, and a compressor software module 111 for operating on the host processor 102. The rendering instruction generator software module 109, rendering instruction loader software module 110, and compressor software module 111 may alternatively be implemented in hardware and coupled to the bus system 108 or intercoupled with local buses (not shown). In addition, the render engine 105 can alternatively be implemented as a software module for operation on the host processor 102. The RAM memory 103 is adapted to store an instruction queue 112 of one or more sets of render instructions generated by the rendering instruction generator software module 109. The font memory 104 has stored therein font characters of one or more fonts for use by the rendering engine 105. The render instruction generator 109 generates one or more sets of rendering instructions in response to the high-level page description and queues them on an instruction queue 112 in RAM memory 103. The rendering instruction loader software module 110 takes one set at a time of these sets of instructions from the instruction queue 112 and loads it into the rendering engine 105, which outputs these instructions as pixels to the output device 106 and printer engine 107. The render engine 105 sometimes instead of rendering the set of instructions to the output device 106 renders the set of instructions as an image to the compressor software module 111. The compressor software module 111 compresses this image and feeds it back to the instruction queue 112 in memory 103 for subsequent use by the render engine 105.

The above mentioned hardware components of the computer system 100 are interconnected via a bus system 108, and are operable in a normal operating mode of computer systems well known in the art, such as the IBM PC/AT type personal computers and arrangements evolved therefrom, Sun Sparcstations and the like. The components of the computer system 100 may also exist in separate computing environments. Preferably, these software modules may be stored on a computer readable medium, such as a floppy disk, optical disk, memory card or other suitable mediums.

In an alternative embodiment, the pixel data produced by the render engine 105 may be optionally sent directly to the instruction queue 112 and not be compressed. In another embodiment, the pixel data may be kept within the render engine 105 itself for subsequent use by the render engine 105. Other embodiments are possible where there is no instruction queue or render instruction loader. In these cases, the render instruction generator 109 would synchronously load instructions into the render engine 105. In yet another embodiment it is possible for the render instruction generator 109 to be situated in a separate computer, and connected via a network or some other kind of data link to the computer containing the instruction queue 112 and/or the render engine 105. In addition, the computer system 100 preferably utilises flow control for the page description. That is, if the render list generator 109 cannot receive the page description data, the page description data will remain uncorrupted, with no loss of data, until the render list generator 109 is ready to receive it.

The high-level page description can be any known high-level page description language for describing the layout of a printed page, such as the POSTSCRIPT language, in the form of objects arranged in z-order.

Figure 1B:
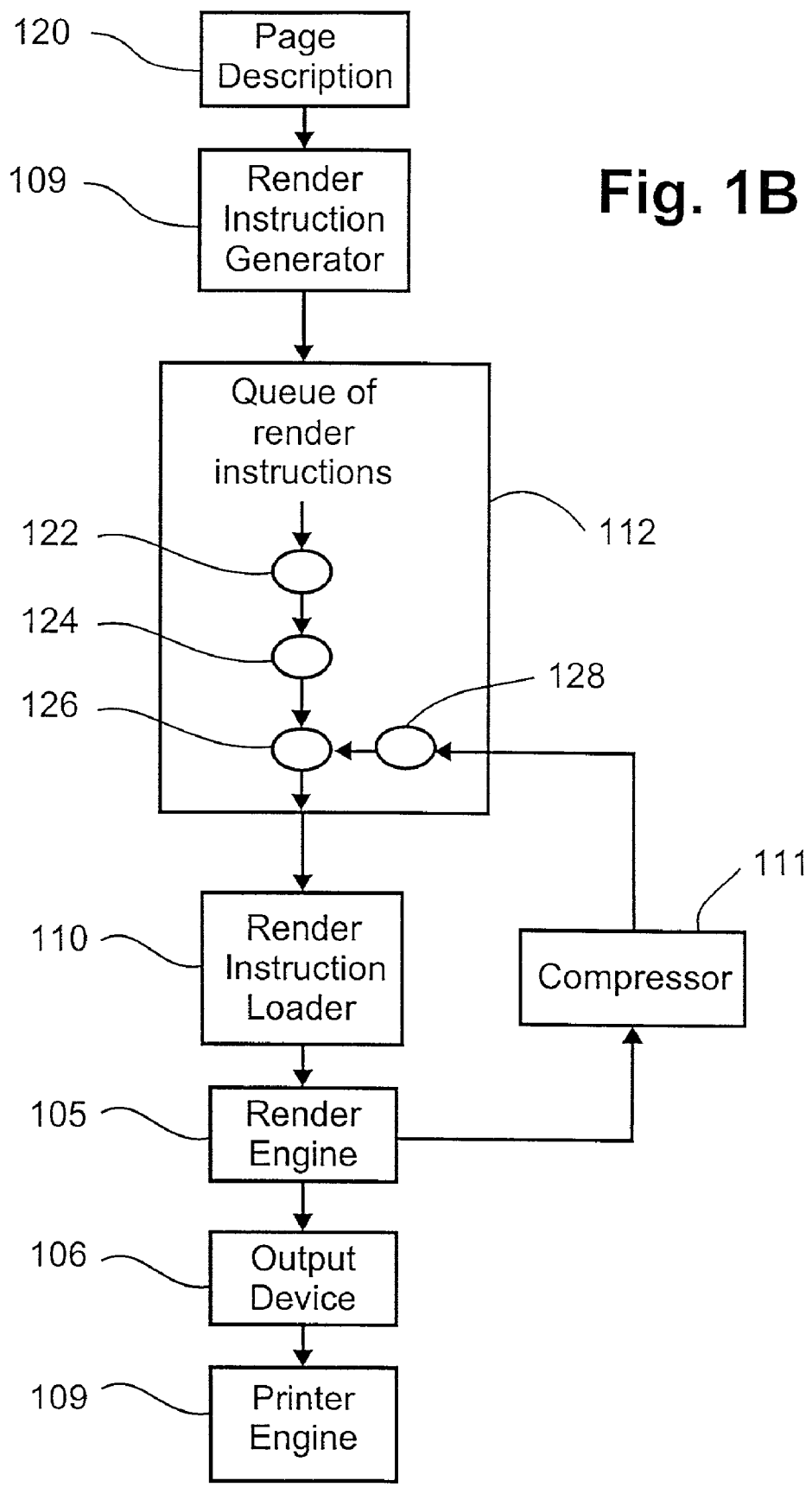
FIG. 1B is a block diagram showing the functional data flow of the computer system of FIG. 1A in accordance with the preferred embodiment.

Turning now to FIG. 1B, there is shown a block diagram showing the functional data flow of the computer system of FIG. 1A. The host processor 102 receives a high-level page description 120. Such a high-level page description 120 may be supplied by a graphics package operating on the host processor 102, or from graphics application on some other host processor connected via a network with this one. The render instruction generator 109 then generates one or more sets of rendering instructions (122, 124, 126) in response to the high-level page description 120, which is described in more detail below. These one or more sets of rendering instructions (122, 124, 126) are queued on an instruction queue 112 in memory 103. The render instruction loader 110 then loads one at a time these one or more sets of rendering instructions (122, 124, 126) from the instruction queue 112, which is described in more detail below. The render engine 105 then renders the one or more sets of rendering instructions, which is described in more detail below. The rendering engine 105 supplies output pixels (image) to the output device 106 and printer engine 107. The rendering engine 105 in certain conditions instead of supplying the output pixels (image) to the output device 106 supplies them to the compressor 111. The compressor 111 compresses this image 128, which is fed back to the instruction queue 112 for subsequent use by the rendering engine 105. The computer system 100 operates in a pipeline manner, with the render instruction generator 110 and rendering instruction loader capable of operating in a simultaneous and asynchronous manner.

Figure 1C:
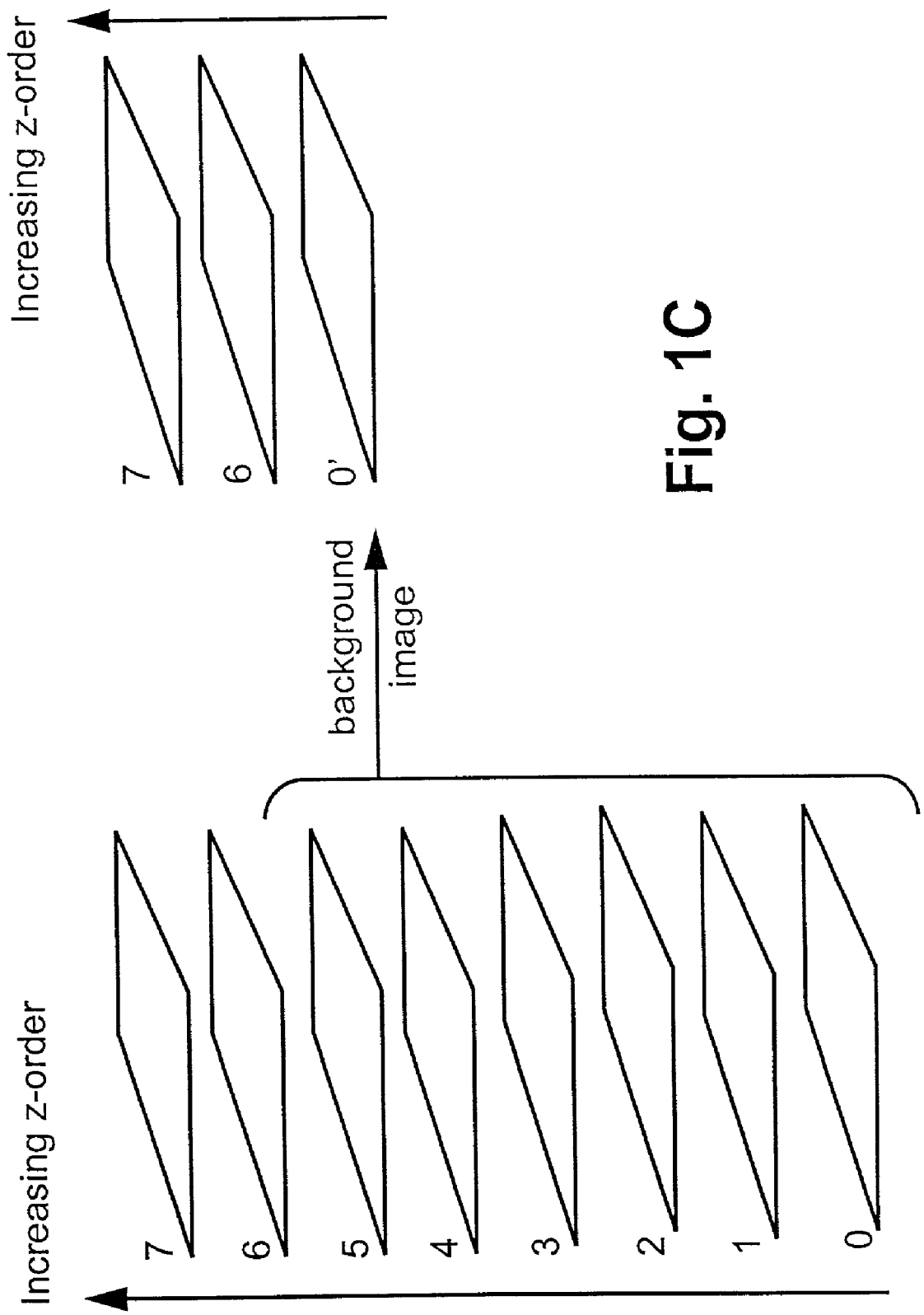
FIG. 1C is a block diagram showing objects of an exemplary page description and corresponding converted objects for illustrating the operation of the computer system of FIG. 1A.

Turning now to FIG. 1C, there is shown objects of an exemplary page description and corresponding converted objects for illustrating the operation of the computer system of FIG. 1A. The render instruction generator 109 receives the objects (0, 1, 2, 3, 4, 5, 6, and 7) of the page description one at a time in increasing z-order commencing at the lowermost object (0) (viz bottom to top). The render instruction generator 109 first generates an initial set of rendering instructions for the page description. This initial set of instructions typically contains any basic instructions necessary for the rendering of the page. The render instruction generator 109 then determines if a set of instructions containing the basic instructions and the rendering instructions corresponding to the lowermost object (0) will cause the resource limits of the computer system 100 to be exceeded. In this example, the render instruction generator 109 determines the resource limits are not exceeded for this set of instructions. The render instruction generator 109 then determines if a set of instructions containing the basic rendering instructions, the rendering instructions corresponding to the next lowermost object (1), and the rendering instructions corresponding to the lowermost object (0) will cause the resource limits of the computer system 100 to be exceeded. In this example, the render instruction generator 109 determines the resource limits are not exceeded for this set of instructions. The render instruction generator 109 continues adding instructions to the set until it determines that the resource limits will be exceeded by the set. In this example, the render instruction generator 109 determines that the resource limits will be first exceeded when the set of instructions contains the basic rendering instructions and the rendering instructions for the objects (0, 1, 2, 3, 4, 5, and 6). The render instruction generator 109 then supplies the set of instructions containing the basic rendering instructions and the rendering instructions for the objects (0, 1, 2, 3, 4, and 5) to the render engine 105 preferably via an instruction queue 112 and an rendering instruction loader 110.

The render instruction generator 109 then creates a new initial set of the basic instructions and first adds rendering instructions to draw a background image on the page corresponding to objects (0, 1, 2, 3, 4, and 5), which is designated in FIG. 1C as object 0'. These rendering instructions do not contain the background image itself but contain a reference to the background image, which will be subsequently generated by the render engine. The rendering instruction generator 109 then proceeds to determine in the same manner as described above, whether adding rendering instructions corresponding to object 6 to the newly created set will cause the resource limits to be exceeded. In this example, the rendering instruction generator 109 determines that adding rendering instructions for both objects 6 and 7 to the newly created set will not cause the resource limits to be exceeded.

The render engine 105 at some later time generates pixel data in the form of a background image in response to the first set of rendering instructions (ie. corresponding to objects 0, 1, 2, 3, 4, and 5). The render engine 105 then generates pixel data in response to the second set of rendering instructions (ie. corresponding to objects (0', 6, and 7) and using the pixel data generated by the render engine 105 in response to the first set of rendering instructions for the background image, ie. object 0'.

In this way, the preferred embodiment is able to create instructions, which produce a page in layers. Objects that have arrived first in the page description, and hence are lowest in z-order, are converted into instructions and then rendered into pixels as a layer. These pixels are used as a background image for the next layer. A complex page, or a page containing large objects, may be rendered onto the frame-store in several layers. A number of lower order objects of the page which utilise significant resources may be rendered as an image, which in turn can be used as a background image for further higher order objects of the page. This has the advantage that the background image object may utilise fewer resources than its corresponding number of objects. A page comprising a large number of objects, which would normally exceed the resource limits of the system, can be converted into layers and thus not exceed the resource limits.

Figure 2A:
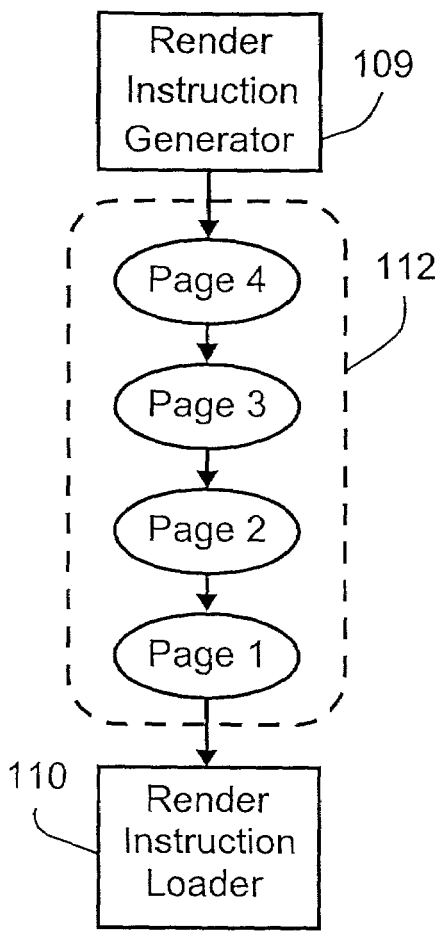
FIG. 2A is a block diagram illustrating one example of the queuing of multiple pages in accordance with the preferred embodiment.

FIG. 2A is a block diagram illustrating one example of the queuing of multiple pages in accordance with the preferred embodiment. The mechanism of queuing and sharing of queue space resources allows multiple pages to be prepared and rendered separately in the preferred embodiment. In the preferred embodiment, the instruction queue 112 functions in a fixed or restricted amount of memory. In the preferred embodiment, sets of render instructions representing either a whole page, or a layer in z-order within the page, are queued in the instruction queue 112. Alternatively, it is possible to continuously stream the instructions, with the render instruction loader 110 determining the breaks between pages or layers, and starting the render engine when a full page or layer has been loaded.

Preferably, a set of render instructions is completely prepared, then queued. FIG. 2A shows an example of the appearance of the instruction queue 112 when every page could be rendered within the limits of render and system resources. In this example, each set of render instructions represents a whole page. These are queued in the order they are received from the page description, with Page 1 first, Page 2 second, Page 3 third and so on.

Figure 2B:
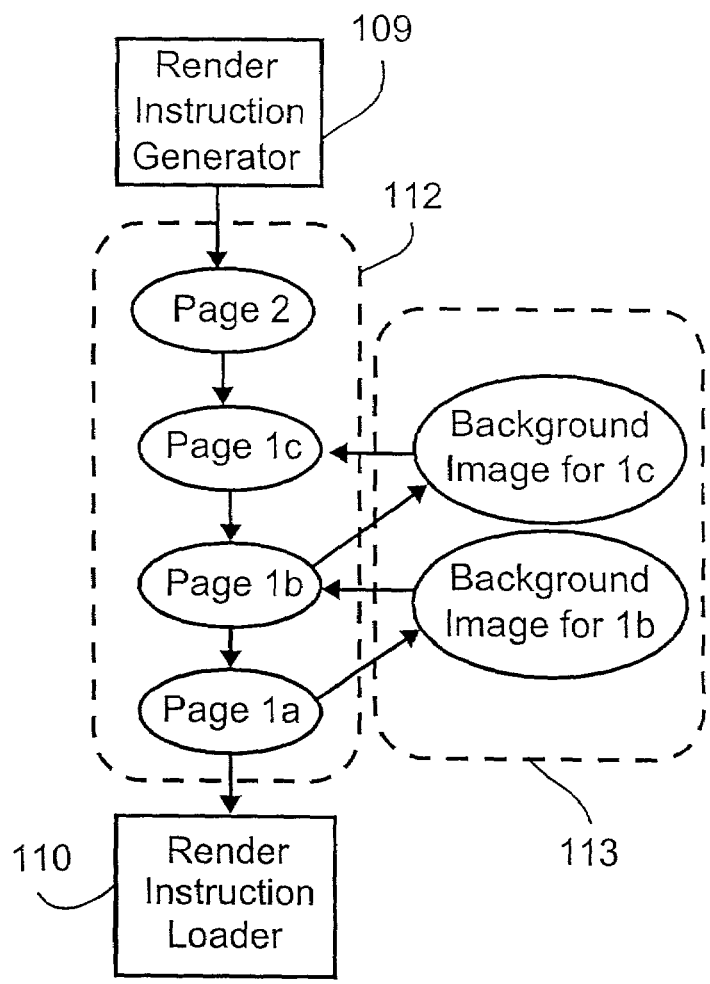
FIG. 2B is a block diagram illustrating another example of the queuing of multiple pages in accordance with the preferred embodiment.

FIG. 2B is a block diagram illustrating another example of the queuing of multiple pages in accordance with the preferred embodiment. FIG. 2B shows an example of the appearance of the instruction queue 112 when one of the pages requires layering. Page 1 containing a large number of objects would exceed the resource limits of either the system or the render engine. Therefore, Page 1 is split into layers Page 1a, Page 1b and Page 1c. Page 1a is the most obscured layer (lowermost) of the page. It does not need a background image, as its background is the paper. The rendered output of the Page 1a instructions goes to a reserved space 113 in memory 103 as the background image for Page 1b. The reserved space 113 in memory 103 acts as a frame-store for the background image for Page 1b. Then if Page 1 requires another layer, the same reserved space 113 in memory 103 for the background image can be used as a frame store for the background image for the next layer, Page 1c. For the sake of clarity, the reserved space 113 in memory 103 for the background images for Pages 1b and 1c is shown separately. The rendered output of Page 1b instructions goes into the space 113 reserved for the background image of Page 1b. This works because the rendered output of Page 1b is a picture of the whole page drawn so far, from the bottom up. The background image produced by Page 1a instructions is part of this picture. So the background image produced by Page 1a need not be kept. Page 1c uses the background image produced by Page 1b, and produces the final picture of the page, which is directed to the printer. Page 2 is on the queue, and does not require layering.

Figure 2C:
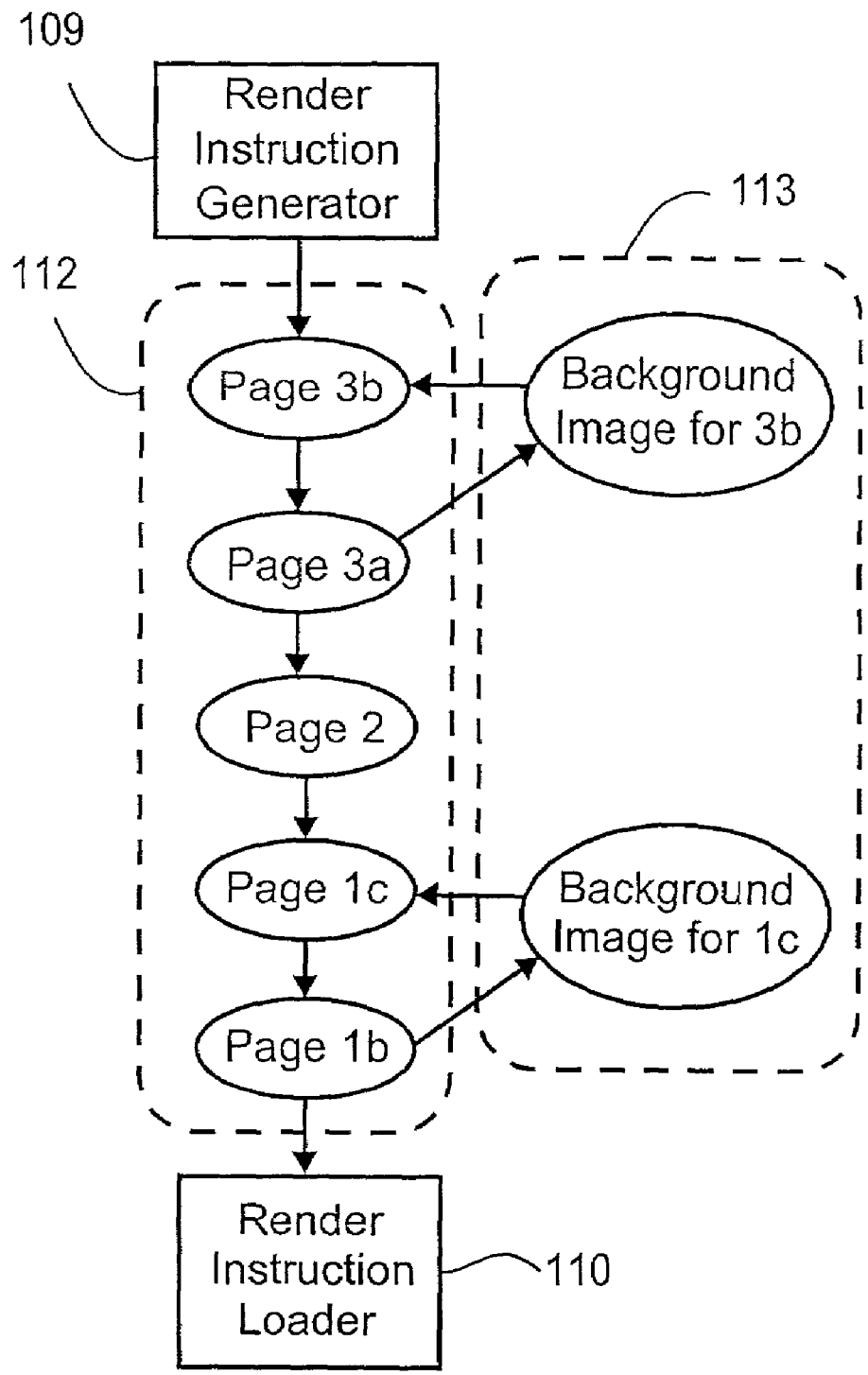
FIG. 2C is a block diagram illustrating the queuing of the pages in FIG. 2B at a further stage in time.

FIG. 2C is a block diagram illustrating the queuing of the pages in FIG. 2B at a further stage in time. In particular, it shows an example of the appearance of the instruction queue 112 when two pages require layering, and both pages are simultaneously in the queue. FIG. 2C is a time continuation of FIG. 2B, where Pages 1a and 1b have been de-queued. Page 1c is still on the queue when the space in memory 103 is about to be reserved for the background image for Page 3b. The same space 113 in memory 103 is reserved for the background image for Page 3b as is reserved for background image for Page 1c. For the sake of clarity, the reserved space 113 in memory 103 for the background images for pages 1c and 3b is shown separately. The output of Page 3a is directed into this reserved space, and the background image for Page 3b is read from this space.

The space reserved in the memory 103 for the background image varies in size for different pages. If, for example, a layer contains only black and white objects, the compressed pixel data representing that layer will take less space than a full colour layer compressed. So the space reserved for the background image is smaller for black and white or mono-tone layers. This makes sharing the space for the background image a little more difficult. If layers generated earlier are still in the queue, but the space previously reserved for the background image is insufficient, then the additional amount of space required for this layer is reserved and added onto the space kept for the background image. The original portion of reserved memory is still used, as well.

The implementation of the instruction queue in the preferred embodiment uses a dynamic memory allocator, which operates on the memory reserved for use by the background images. This dynamic memory allocator is thread-safe, to allow the render instruction generator to allocate memory in it, and to allow the render instruction loader, which operates asynchronously, to free the memory.

In the preferred embodiment, the reserved space in memory 103 for the background image is shared between all layers that need it. This is possible because the Render Instruction Loader 110 removes each layer from the queue as it loads it into the render engine 105. The render instruction loader could de-queue pages out of order for duplexing etc. In the latter case, enough memory must be made available and out of order dequeuing must be accounted for in resource calculation.

However, with some other embodiments it may be necessary to keep the instructions on the queue. For example, the instructions could be kept until the page is known to have been printed without error. If there was a printing or paper error, the instructions can be re-loaded into the render engine, and the page can be printed again. One way of keeping a complete set of instructions to render each page is to discard all layers but the last one, and keep the background image associated with the last layer. In this type of system, the reserved space for the background image may be shared within a page, but the background image for each page will need its own separate reserved space, as there may be valid data in multiple background images at the same time. Another possible method is to render the last layer as background image for the page, and just keep the background image for the page. In general this saves space, but wastes time, unless the compressor can be run synchronously with the printer, and accept data at the same speed as the printer. Then the image used for paper error recovery can be generated with no loss of system speed. A background image still needs to be kept per layered page. An alternative mechanism is to keep all the render instruction data for all the layers of the page. Then the background image can be shared between all pages. But if the limit that caused a layer was the size of memory available for the render instruction queue, the layers must be freed to allow other jobs to print. A hybrid of all the above approaches is possible. Namely, a hybrid mechanism that minimises the memory saved for paper error recovery, while maximising the throughput speed.

Figure 3A:
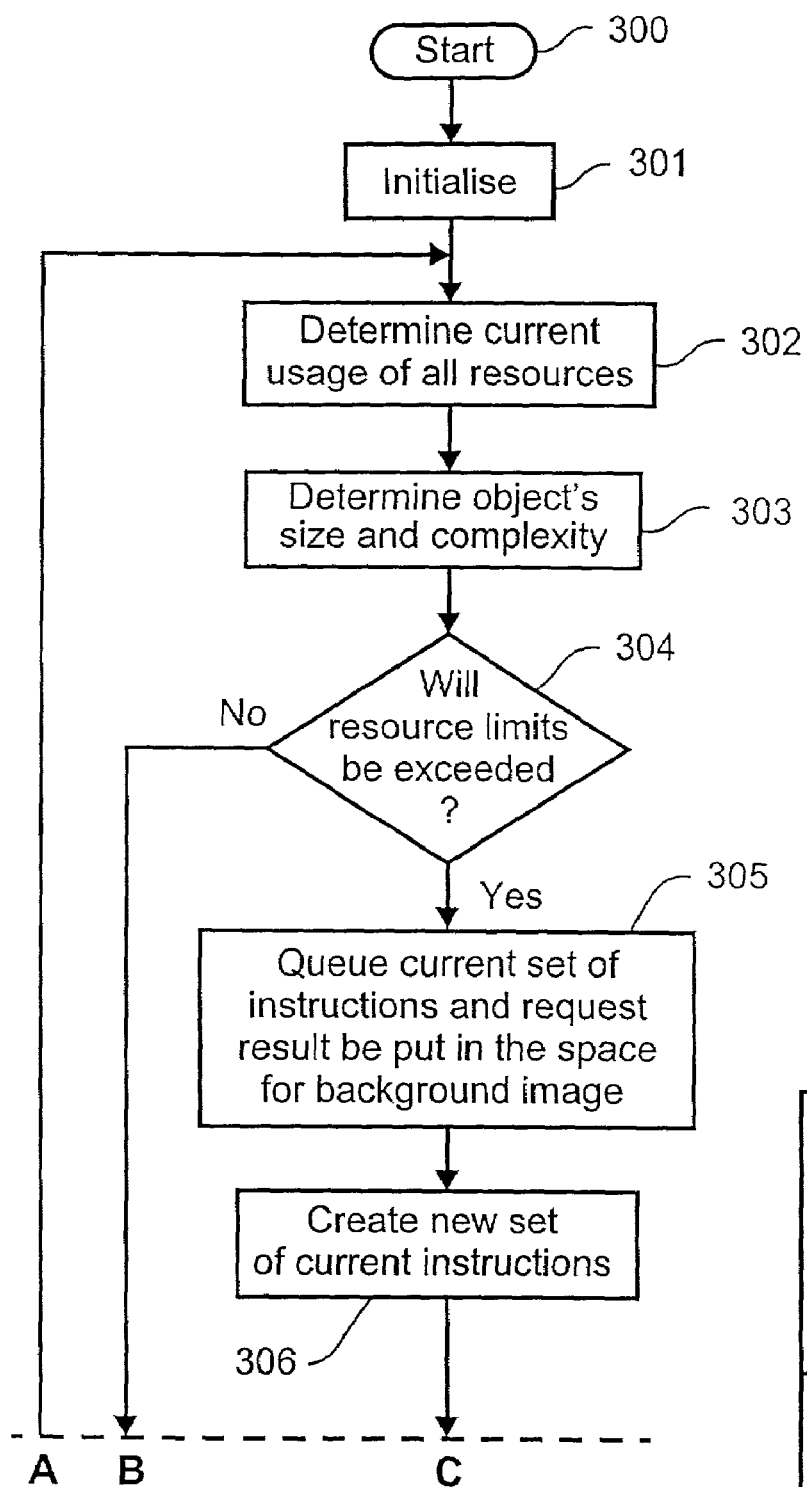
FIGS. 3(a) and 3(b) show a flow chart of the procedure for generating one or more sets of rendering instructions used by the render instruction generator of FIG. 1A.
Figure 3B:
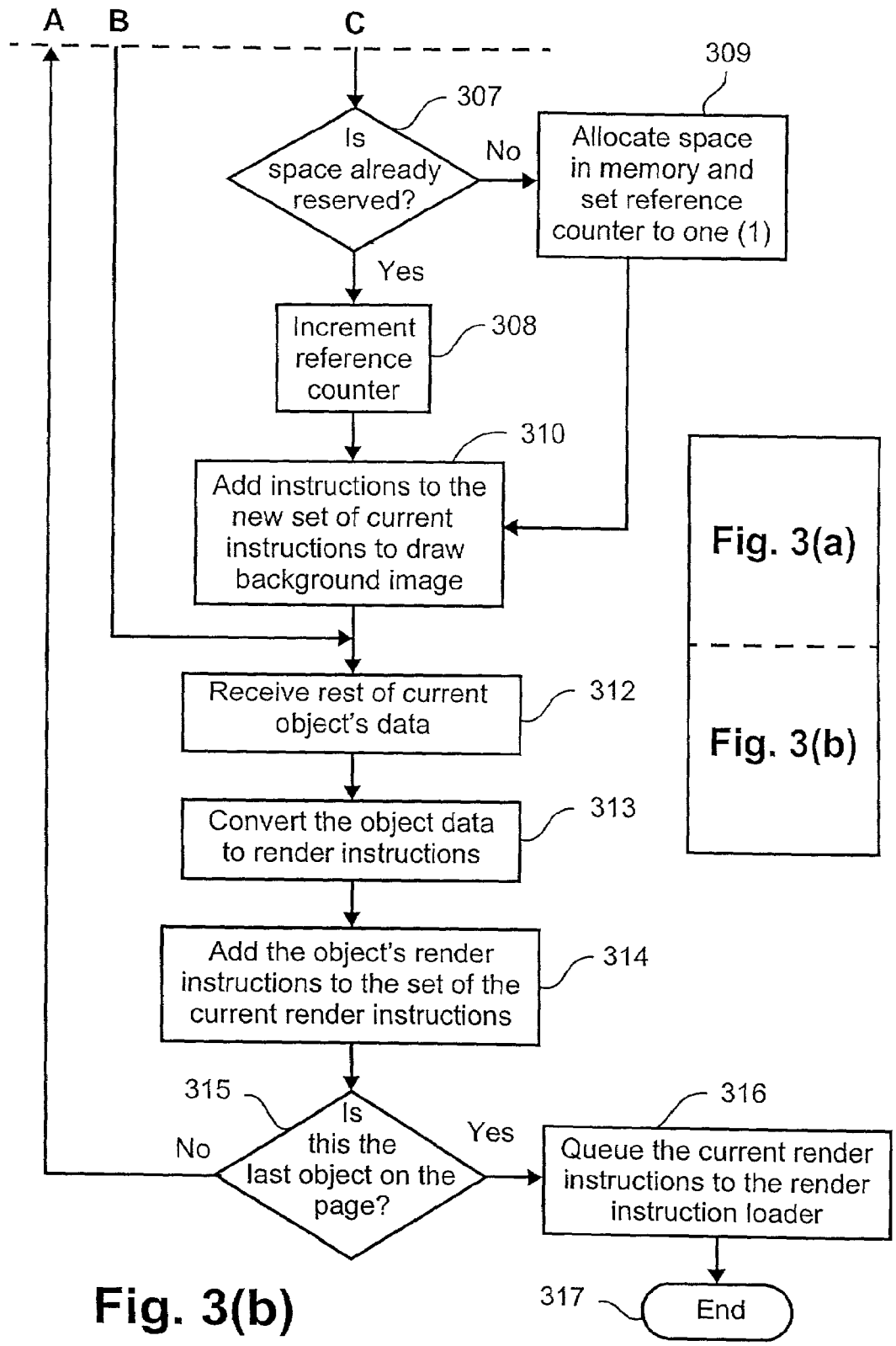

FIGS. 3(a) and 3(b) show a flow chart of the procedure for generating one or more sets of rendering instructions used by the render instruction generator of FIG. 1A. The render instruction generator 109 is started 300 and initialised 301 for each single printed page. Initially, at step 301, it creates a new set of current render instructions containing the basic render instructions that are always required for every page. The render instruction generator 109 receives and processes objects one by one from the page description. Next, at step 302, it obtains the current usage of all render and system resources utilised by the set of current render instructions. The render instruction generator 109 then proceeds to step 303, where it retrieves enough information about the next object in the page description to determine the object's complexity and size. The manner in which this is determined is further explained below with reference to FIG. 4(a) and 4(b).

The render instruction generator 109 then proceeds to decision block 304, where it queries whether adding the object's render instructions to the set of current render instructions would cause the resultant set of instructions to exceed the resource limits. In particular, it checks whether this resultant set of instructions would cause an overflow of the complexity limits or memory capacity of the render engine, or would cause the resultant set of instructions to use an excess of memory in the render instruction queue.

If decision block 304 returns false (NO), that is the limits are not exceeded, then render instruction generator proceeds to step 312, where the rest of the object data is received, if necessary. The render instruction generator then proceeds to step 313, which is described in more detail below.

On the other hand, if the decision block 304 true (YES), namely the limits are exceeded, then the render instruction generator 109 proceeds to step 305. In step 305, the current set of instructions (not the resultant set of instructions) is queued to the render instruction loader 110 via the instruction queue 112 as a layer of the page. In addition, instructions are added to the current set of instructions requesting that the resultant rendered page be put in the space in memory which will be reserved for the background image in the next set of instructions (not yet queued). The output pixel data generated by rendering this current layer of the page is directed to the space which will be reserved in the subsequent layer at step 308 or step 309. The output pixel data may be compressed or degraded to make it fit in the available space. The size of the space reserved is determined by the compression ratio required for the background image pixel data.

After step 305, the render instruction generator 109 proceeds to step 306, where a new set of current render instructions is created. This new set of current render instructions contains initially the basic render instructions that are always required for every page.

After step 306, the render instruction generator 109 proceeds to decision block 307, where a check is made if there is space already reserved somewhere in the queue for the background image. If the decision block 307 returns TRUE (YES), then render instruction generator 109 increments the reference count associated with the reserved space (step 308). The decision block 307 and step 308 are done indivisibly, to prevent the render instruction loader 110 from de-queuing the reserved space while the render instruction generator is trying to reference it. If decision block 307 returns FALSE (NO), that is no space already exists in the queue for the background image, then the render instruction generator 109 reserves space in memory and sets the reference count associated with the reserved space to 1 (step 309).

The render instruction generator 109 then proceeds to step 310. In step 310, the render instruction generator 109 adds instructions to draw an image the size of the whole page (the background image) to the current render instructions, previously created during step 306. The resultant current set of instructions will then be the basic instructions for rendering the page, and the instructions to draw the background image. The background image will be located at the reserved space by the time this set of instructions is ready to be loaded to the render engine 107.

After step 310, the render instruction generator 109 proceeds to step 312. In the event decision block 304 returns FALSE (NO), the render instruction generator 109 also proceeds to step 312. In step 312, the render instruction generator 109 receives the rest of the incoming object, if necessary. This is explained in more detail below with reference to FIGS. 5(a) and (b). After step 312, the render instruction generator 109 then converts the object into render instructions, which is an intermediate data form of the page description (step 313) and then adds these converted render instructions to the set of current render instructions (step 314). Where the resource limits have been exceeded (304), a new set of current instructions has been created. In this case, the current set (step 314) is the newly new set of instructions. On the other hand, where the resource limits have not been exceeded (304), the current set (step 314) is the existing set of instructions.

After step 314, the render instruction generator 109 proceeds to decision block 315. In decision block 315, a check is made whether the current object is the last object on the page. If the decision block 315 returns TRUE (YES), the set of current render instructions are queued (step 316) on the instruction queue 112 for subsequent loading by the render instruction loader 110. Otherwise, if the decision block 315 returns FALSE (NO), the render instruction generator 109 returns to step 302 to receive the next object, where the process starts again for the next object.

In the preferred embodiment, objects passed to the system can be text characters or shapes or images. Characters and paths can be filled with flat colour, blended colour, image colour data (possibly tiled), or pattern colour data (also possibly tiled). Objects can also be used to define clip regions. The render engine 105 requires every object to be bound by edges. Therefore the render instruction generator 109 creates edges for all incoming objects, even if the incoming object did not have an explicit outline defined. The region filled by the object is always defined by the page description, either explicitly or implicitly. The render instruction generator 109 uses this definition to generate edges. So as every object generates edges, every object can be used as a clip. The render engine supports clips. Most clips use up only one level, and no colour slots.

Figure 4A:
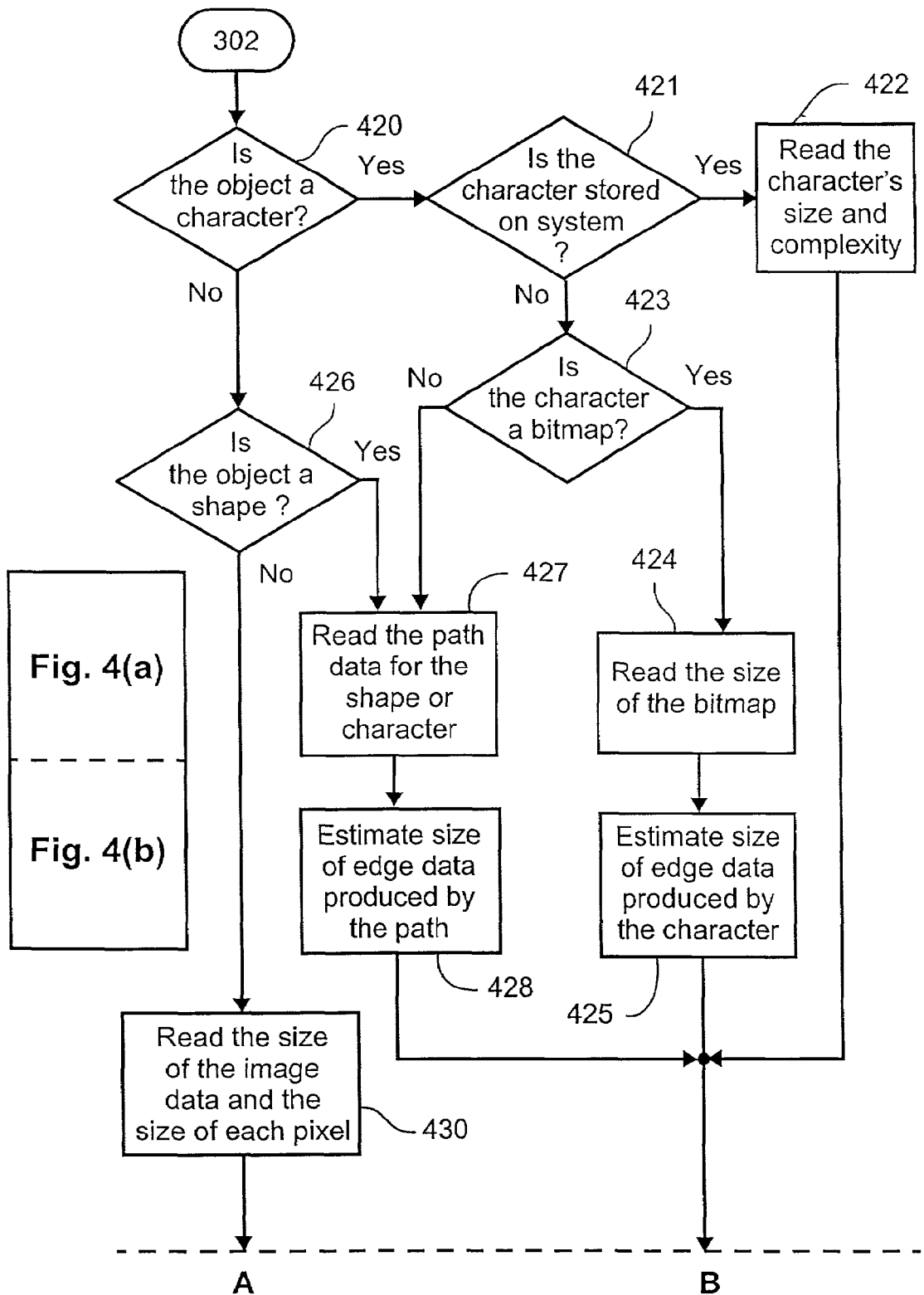
FIGS. 4(a) and 4(b) show a flow chart of the sub-steps of the step of determining the object's size and complexity as shown in FIG. 3(a)
Figure 4B:
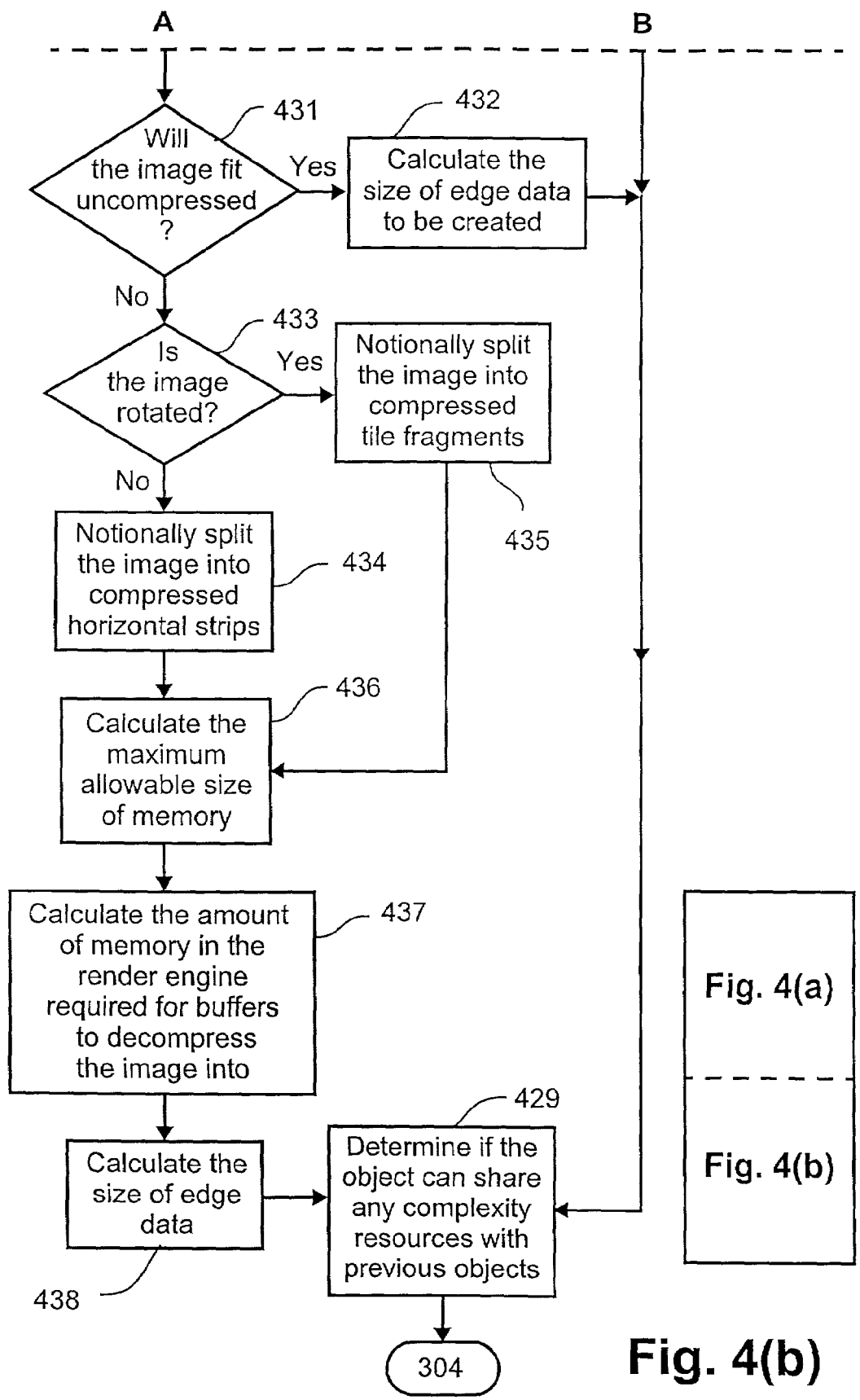

Turning now to FIGS. 4(a) and 4(b), there is shown a flow chart of the sub-steps of the step 303 for determining the object's size and complexity as shown in FIG. 3(a). During this process, the render instruction generator 109 receives part of the data for an object, which part being enough to determine the size and complexity of the object. After step 302, the process proceeds to decision block 420, where a check is made whether the current object is a character. If it is a character, the decision block 420 returns TRUE (YES) and the render instruction generator proceeds to decision block 421. In decision block 421, a check is made whether the character is already stored in the system in the font memory 104. If the decision block 421 returns TRUE (YES), the render instruction generator 109 proceeds to step 422, where the character's pre-calculated size and complexity is obtained. This is returned for subsequent use in decision block 304. The render instruction generator 109 then proceeds to step 429.

If the decision block 421 returns FALSE (NO), the render instruction generator 109 proceeds to decision block 423, where a check is made whether the character is a bit map. If the decision block 423 returns TRUE (YES), the render instruction generator 109 proceeds to step 424, where the size of the bit map (width and height) is read, but not the bit map data itself. After step 424, the render instruction generator 109 proceeds to step 425, where the render instruction generator 109 calculates a pessimistic estimate of the size of the edge data produced by the character, by assuming a 1-pixel checkerboard or similar. This is returned as the current object's size and complexity for subsequent use in decision block 304. After step 425, the render instruction generator 109 proceeds to step 429.

If the decision block 423 returns FALSE (NO), namely the character was not a bit map, the render instruction generator 109 proceeds to step 427.

If the decision block 420 returns FALSE (NO), namely the object is not a character, the render instruction generator 109 proceeds to decision block 426, where a check is made whether the current object is a shape defined by path data. If the decision block 426 returns TRUE (YES), the render instruction generator proceeds to step 427.

During step 427, the render instruction generator 109, reads the path data for the shape or character. Alternatively, the render instruction generator 109 can defer the reading of path data, and retrieve enough information from within the header for the path data to determine the size and complexity of the shape or character. This has not been implemented in the preferred embodiment because most existing page description languages do not contain this kind of header information. After step 427, the render instruction generator 109 proceeds to step 428, where it calculates a pessimistic estimate of the size of the edge data that would be produced by the path, using the number of points in the path and the bounding box of the path. This is returned as one aspect of the current object's size and complexity for subsequent use in decision block 304. After step 428, the render instruction generator 109 proceeds to step 429.

If the decision block 426 returns FALSE (NO), the render instruction generator, proceeds to step 430. If the current object is not a character or a shape, it must be an image. During step 430, the render instruction generator 109 reads the header for the image, which defines the size of the image data (width and height), and the size of each pixel (step 30). The header also contains the transform to be applied to the image. After step 430, the render instruction generator 109 then proceeds to decision block 431.

In decision block 431, a check is made whether the image will fit uncompressed within the maximum memory allowed for an image in both the queue and the render engine. If the decision block 431 returns TRUE (YES), the render instruction generator 109 then calculates the amount of edge data which will be generated by transforming all four corner points of the image by the image transform. After step 432, the render instruction generator proceeds to step 429.

If the decision block 431 returns FALSE (NO), the render instruction generator 109 proceeds to decision block 433, where a check is made whether the image is rotated.

If the image is not rotated, or is rotated by only a small angle, the decision block 433 returns FALSE (NO) and the render instruction generator proceeds to step 434. During step 434, the render instruction generator 109 calculates resources knowing the image will be split into horizontal compressed strips. After step 434, the render instruction generator 109 proceeds to step 436.

On the other hand, if the image is rotated through a substantial angle, the decision block 433 returns TRUE (YES) and the render instruction generator 109 proceeds to step 435. In step 435, the render instruction generator 109 calculates resources knowing the image will be split into tiled compressed fragments. After step 435, the render instruction generator 109 proceeds to steps 436.

During step 436, the render instruction generator 109 calculates the maximum allowable size of memory that the total compressed data of the image may occupy. This is returned as one property of the current object's size and complexity for subsequent use in decision block 304. After step 436, the render instruction generator proceeds to step 437, where it calculates the amount of memory required in the render engine 105 for buffers to decompress the image data. This is returned as another property of the current object's size and complexity for subsequent use in decision block 304. After step 437, the render instruction generator 109 proceeds to step 438, where it calculates the space in memory that will be required for the edge data of the horizontal strips or tiled fragments. This is returned as farther property of the current object's size and complexity for subsequent use in decision block 304. After step 438, the render instruction generator 109 then proceeds to step 429.

During step 429, the render instruction generator 109 determines if the current object can share any complexity resources, being a level and/or colour slot in the preferred embodiment, with any previous object in the current render instructions, based on its extent and fill colour. If the object cannot share levels or fill colours with previous objects, new levels must be allocated for it when it is added. These may cause the set of current render instructions to overflow the limitations of the render engine 105. Also, the object will use up a certain amount of memory in both the render instruction queue and the render engine, and it will use up both render and system resources in the generation and tracking of its edges. Adding the object may overflow these limits also. All these limits, plus any others that exist in either the system or the render engine, together with object's size and complexity determined in step 303 are examined at step 304 in FIG.3(a).

Figure 5A:
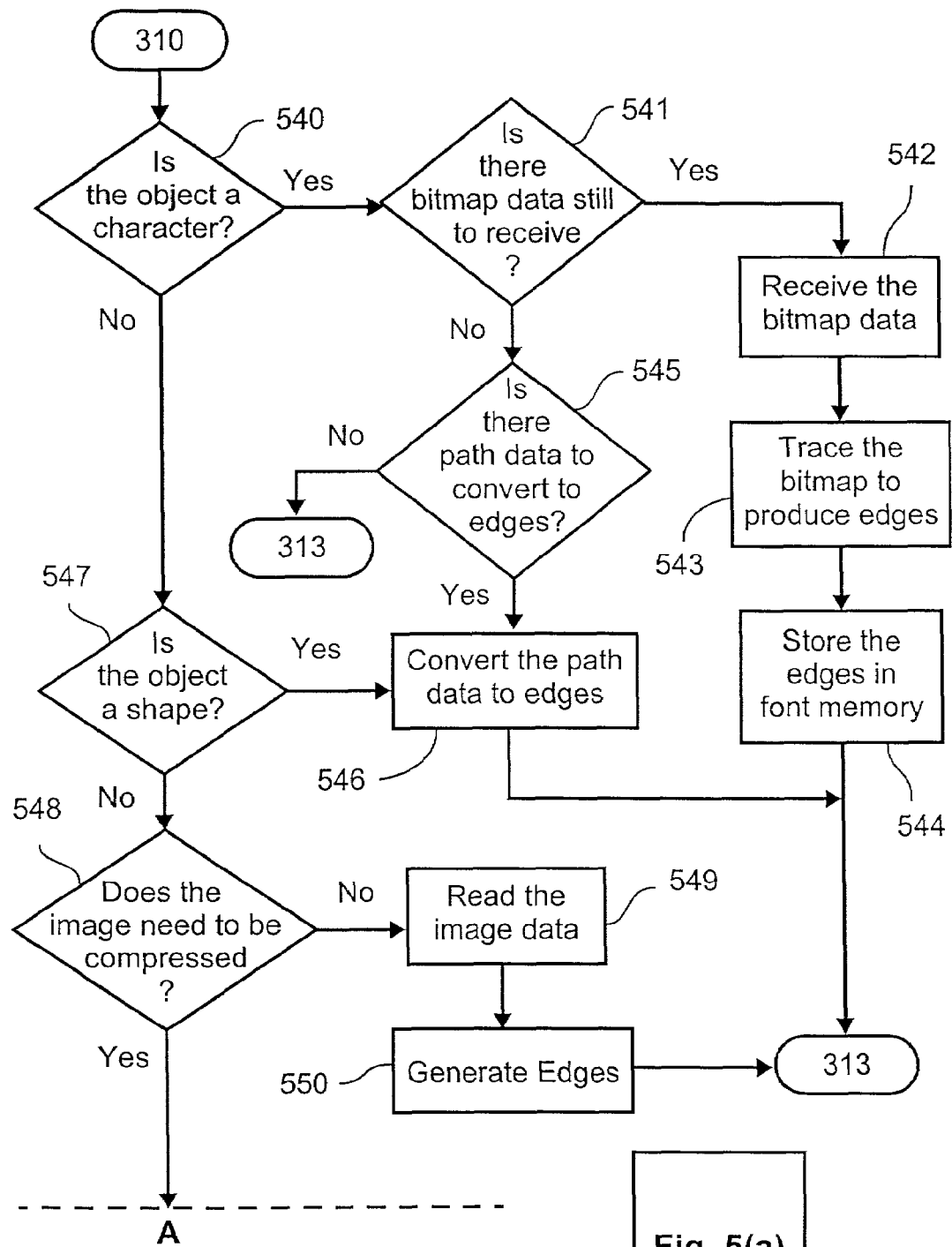
FIGS. 5(a) and 5(b) show a flow chart of the sub-steps of the step of receiving the rest of the current object's data as shown in FIG. 3(b)
Figure 5B:
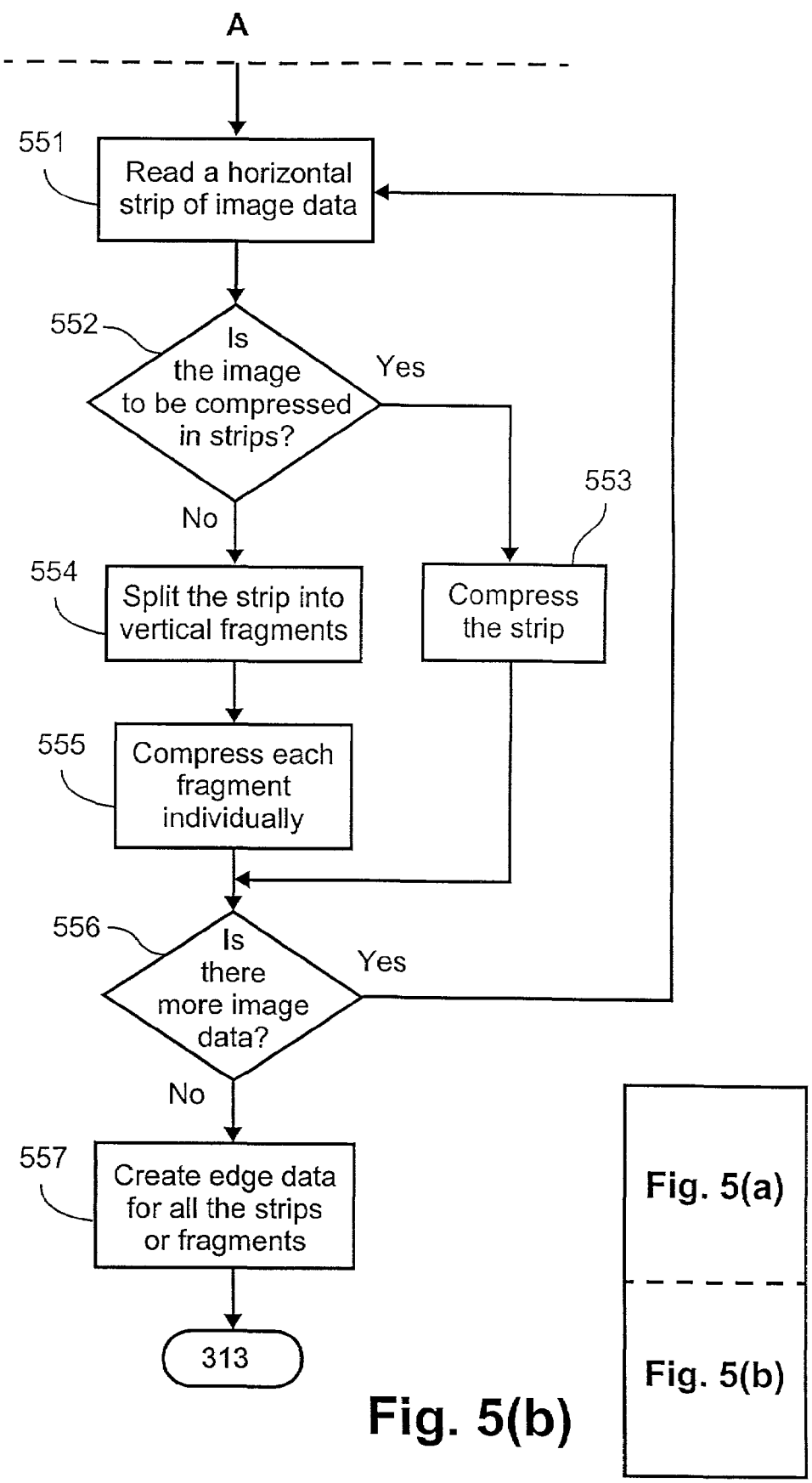

Turning now to FIGS. 5(a) and 5(b), there is shown a flow chart of the sub-steps of the step 312 of receiving the rest of the current object's data as shown in FIG. 3(b). This sub-process commences at step 310 and proceeds to decision block 540, where a check is made whether the current object is a character. If the decision block 540 returns TRUE (YES), the render instruction generator 109 proceeds to decision block 541, where a check is made whether there is still bit map image data to receive.

If the decision block 541 returns TRUE (YES), then the render instruction generator 109 proceeds to step 542, where the bit map data is received. After step 542, the render instruction generator proceeds to step 543, where it traces the bit map image to produce edge data. This edge data is then stored 544 in the font cache 104 using this object's character definition as the character key. This edge data also forms part of the set of current render instructions.

If the decision block 541 returns FALSE (NO), the render instruction generator 109 proceeds to decision block 545, where a check is made whether there is still path data to convert to edges. If there is still path data, the decision block 545 returns TRUE (YES) and the render instruction generator 109 proceeds to step 546, where the path data is converted to edge data. This edge data also forms part of the set of current render instructions.

If the decision block 540 returns FALSE (NO), the render instruction generator 10 proceeds to decision block 547, where a check is made whether the current object is a shape. If the current object is a shape, the decision block 547 returns TRUE (YES) and the render instruction generator 109 proceeds to step 546, where the path data of the shape is converted to edge data. This edge data also forms part of the set of current render instructions.

If the decision block 547 returns FALSE (NO), then the current object was not a bitmap or a shape so it must be an image, and the render instruction generator 109 proceeds to decision block 548, which checks whether the image needs to be compressed. If the image does not need to be compressed, the decision block 548 returns FALSE (NO), and the render instruction generator 109 proceeds to step 549. During step 549, the render instruction generator reads the image data directly into the set of current render instructions. The render instruction generator 109 then proceeds to step 550 where it generates the edges for the image. This edge data also forms part of the set of current render instructions.

The decision block 548 returns TRUE (YES) if the image is to be compressed, and the render instruction generator proceeds to step 551. During step 551, the render instruction generator 109 reads a horizontal strip of image data. After step 551, the render instruction generator 109 proceeds to decision block 552, where a check is made whether the image is to be compressed solely in horizontal strips. If the decision block 552 returns TRUE (YES), the render instruction generator 109 proceeds to step 553 where the strip is compressed.

If the decision block 552 returns FALSE (NO), the render instruction generator 109 proceeds to step 554, where the strip is vertically split into tile fragments. After step 554, the instruction generator 109 proceeds to step 555 where the tile fragments are then individually compressed.

After step 553 or step 555, the render instruction generator 109 proceeds to decision block 556, where a check is made whether there are any more horizontal strips to compress. If the decision block 556 returns TRUE (YES), the instruction generator returns to step 551 where the next horizontal strip of image data is read. The same buffer used for reading the previous horizontal strip may be re-used.

The render instruction generator 109 continues reading and processing the horizontal strips of image data until there is no more image data. The decision block 556 then returns a FALSE (NO), and the render instruction generator continues to step 557. During step 557, the render instruction generator 109 creates the edge data for all the strips or fragments in the image, and continues processing at step 313 of FIG. 3(*b*).

It is possible that due to a constraint of the render system, the image may have to be decimated as well as compressed. Preferably, the render engine 105 allows an image to be scaled down by no more than 2 times. Thus if the input image is more than 2 times the resolution of the printer, pixels must be removed from the input image to lower its resolution. In the preferred embodiment, this is achieved by averaging an appropriate number of pixels in the x direction, and leaving out scanlines in the y direction. The resolution limit is another of the resource limits handled within the system.

In some circumstances the compressed image data does not fit within the maximum space allowed. This is because the compression ratio achieved by most image compression schemes is data dependent, and the desired compression ratio may not be achieved. Also, the entire image must be compressed in the same way, or artifacts will be visible in the printed page. Also, once image data has been read from the page description, it cannot be read again. So if part of an image is compressed, and then it is discovered that the compressed data will not fit into the available space, the existing compressed data must be decompressed and re-compressed to give a higher compression ratio. This is done without using more resources than originally committed to.

Figure 6A:
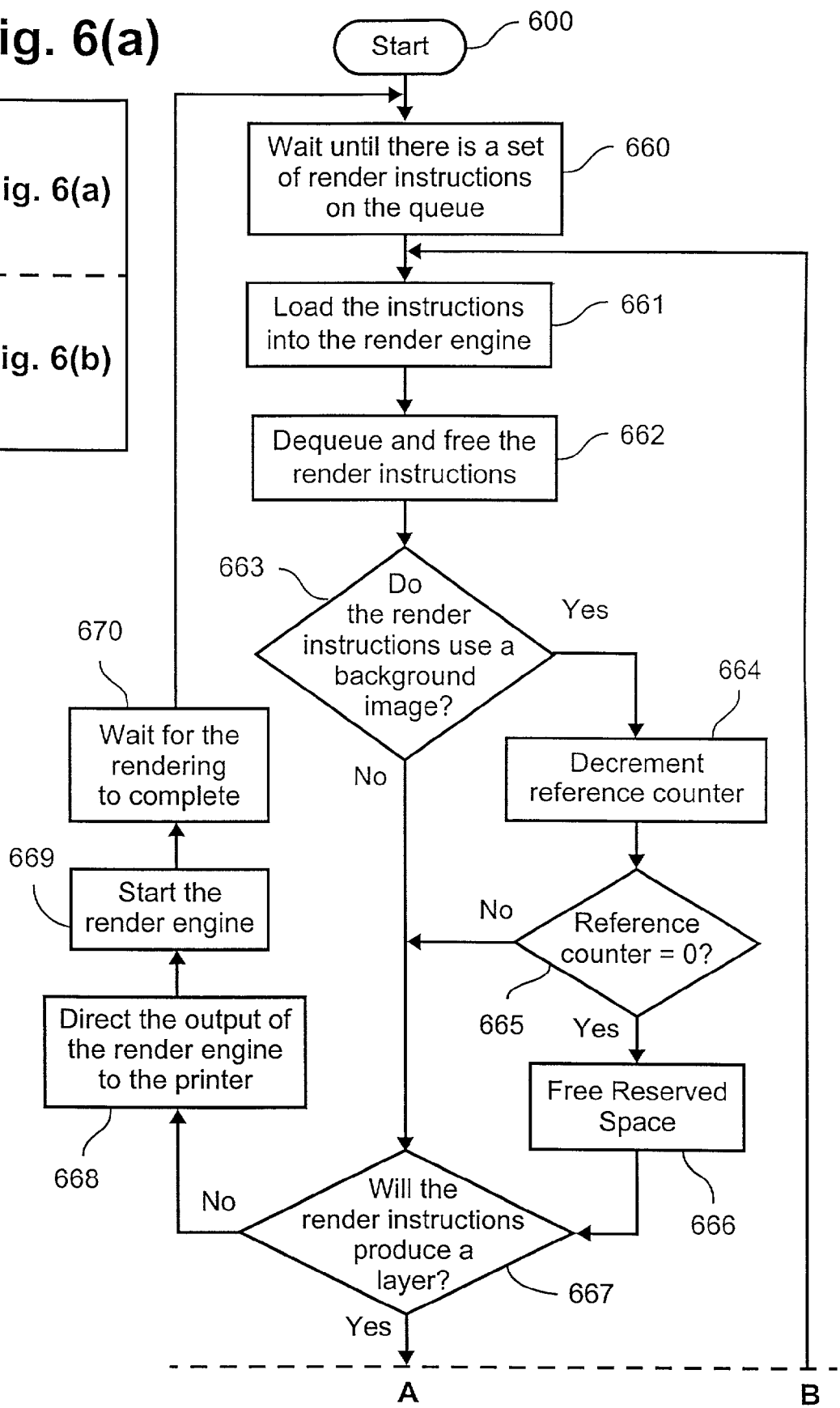

Turning now to FIGS. 6(*a*) and 6(*b*), there is shown a flow diagram of the procedure for loading the one or more sets of rendering instructions used by the render instruction loader of FIG. 1A. The render instruction loader loops continuously, waiting for one or more sets of render instructions to appear in the queue, processing them one set at a time, then waiting again.

The render instruction loader 110 commences at the same time as the render instruction generator 109 but operates in an asynchronous manner thereto. The render instruction loader commences at step 600 and proceeds to step 660, where it waits until there is a set of render instructions on the instruction queue 112. When a set of render instructions has appeared, the render instruction loader 110 at step 661 loads the current set of instructions immediately into the render engine. The render instruction loader proceeds to step 662, where it de-queues the current set of render instructions, extracts control information from the header of the current set of render instructions, and frees the space used by the current set of render instructions in the instruction queue 112.

After step 662, the render instruction loader 110 proceeds to decision block 663, where a check is made whether the current set of render instructions uses a background image. Namely, it checks whether the current set of instructions include instructions to draw a background image. If the decision block 663 returns TRUE (YES), the render instruction loader proceeds to step 664, where the reference counter of the background image is decremented. This reference counter is the same counter as used by the render instruction generator 109 discussed above and can be accessed by both the loader 110 and generator 109.

After step 664, the render instruction loader 110 proceeds to decision block 665, where a check is made whether the reference counter is zero (0). If the reference count is now zero (0), it means there are no other sets of render instructions currently in the queue reserving the same space in memory as the current background image, so this reserved space in memory is no longer needed. It should be noted that the current background image was previously loaded into the render engine during step 661. Thus when the decision block 665 returns TRUE (YES), the render instruction loader 110 frees the reserved space and continues to decision block 667. If the decision block 665 returns FALSE (NO), the render instruction loader proceeds directly to decision block 667. The decrement and test of the reference counter must be done in an indivisible operation, to guarantee correct operation with the render instruction generator 109, which asynchronously adds sets of render instructions to the queue. In another implementation, it is possible for the render engine to execute instructions directly from the queue, so dequeuing instructions and decrementing the reference count would take place after rendering was completed.

In decision block 667, a check is made whether the current set of render instructions will produce a layer, ie. a background image for a subsequent layer. This can be determined from information contained in the header of the current set of render instructions, which is added by the render instruction generator 109. If the decision block 667 returns FALSE (NO), the render instruction loader 110 proceeds to step 668, where it directs the output of the render engine 105 to the printer 106. The render instruction loader 110 proceeds to step 669 where it starts the render engine and then proceeds to step 670 where it waits for the rendering of the current set of instructions to finish. Once the rendering is finished, the rendering instruction loader returns to step 660. In another embodiment, the render instruction loader 110 waits only when the memory in the render engine 105 is exhausted.

On the other hand, if the decision block 667 determines that the current set of render instructions will produce a layer, the render instruction loader 110 proceeds to step 671. During step 671, the render instruction loader 110 waits until the next set of instructions is in the instruction queue 112. When the next set of render instructions are received in the queue the render instruction loader 110 proceeds to step 672. In step 672, the render instruction loader 110 obtains the location of the background image in memory for the next set of render instructions. At this stage the render instruction loader 110 does not dequeue the next set of render instructions but proceeds to step 673, where it instructs the render engine 105 to direct the output of the pixel data for the current set of render instructions to the compressor 111. The render instruction loader 110 then proceeds to step 674, where it instructs the compressor 111 to direct its output for the compressed pixel data of the current set of render instructions to the space in memory reserved for the background image for the next set of render instructions. The render instruction loader 110 then proceeds to step 675, where it instructs the render engine 105 to start rendering the current set of instructions. It also instructs the compressor 111 to compress the resultant output pixel data, which it then stores it in the reserved space in memory. The rendering instruction loader then in step 676 waits for the rendering and compression to be completed. The render instruction loader then proceeds to decision block 677, where a check is made whether the compressed render output pixels fitted into the space available for the background image. If the decision block 677 returns FALSE (NO), then the render instruction loader 110 proceeds to step 678, where it directs the compressor 111 to achieve a higher compression ratio. After step 678, the render instruction loader returns to step 673. On the other hand, if the decision block 677 returned TRUE (YES), namely the compressed render output pixels did fit into the space available for the background image, the render instruction loader 110 continues at step 661.

The render engine 110 can be based on any known render engine with some modification. The render engine should have the capability of re-directing its rendered pixel data back via a compressor to the instruction queue, as well directing its rendered pixel data to the printer. The compressor can be based on any known compressor. Alternatively, the compressor may be dispensed with the result that the background image is uncompressed. In the latter circumstances, this may put resource limits on the rendering system.

The preferred computer system has the advantage that it tests whether the next object will fit before converting it to intermediate data. Sometimes, the test for whether the next object will fit is done even before the data for the object is received by the entire system. For example, a large image may be about to arrive. The system will check whether the image will cause any limits in the system to be exceeded before the data for the image is received. For smaller objects, such as shapes or characters, the data is received by the system but not converted to intermediate data at the time the test for whether the object will fit is made. In this way, the preferred computer system can both use resources efficiently and handle large or complex objects correctly. Moreover, the preferred computer system has significant resource limitations within the render engine that are related to object and render instruction complexity rather than size. The preferred computer system tests whether the incoming object would cause any of the system or render resource limits to be exceeded. It instigates the layering mechanism if the object might cause any limit to be breached. In addition, the preferred computer system has a knowledge of the maximum possible amount of memory that could become available rather than just at the time the object is received, and performs layering only when the maximum amount of memory would be exceeded. This might have the side effect of making the system wait to print a page before more page description data can be received. In addition, the preferred computer system uses compression of background pixel data to make it fit within memory. The compression can be lossy or lossless. Lossy compression may still slightly degrade the appearance of the image, but the appearance will be better than degrading the pixel data. Lossless compression causes no degradation of the appearance of the final image at all.

Figure 7:
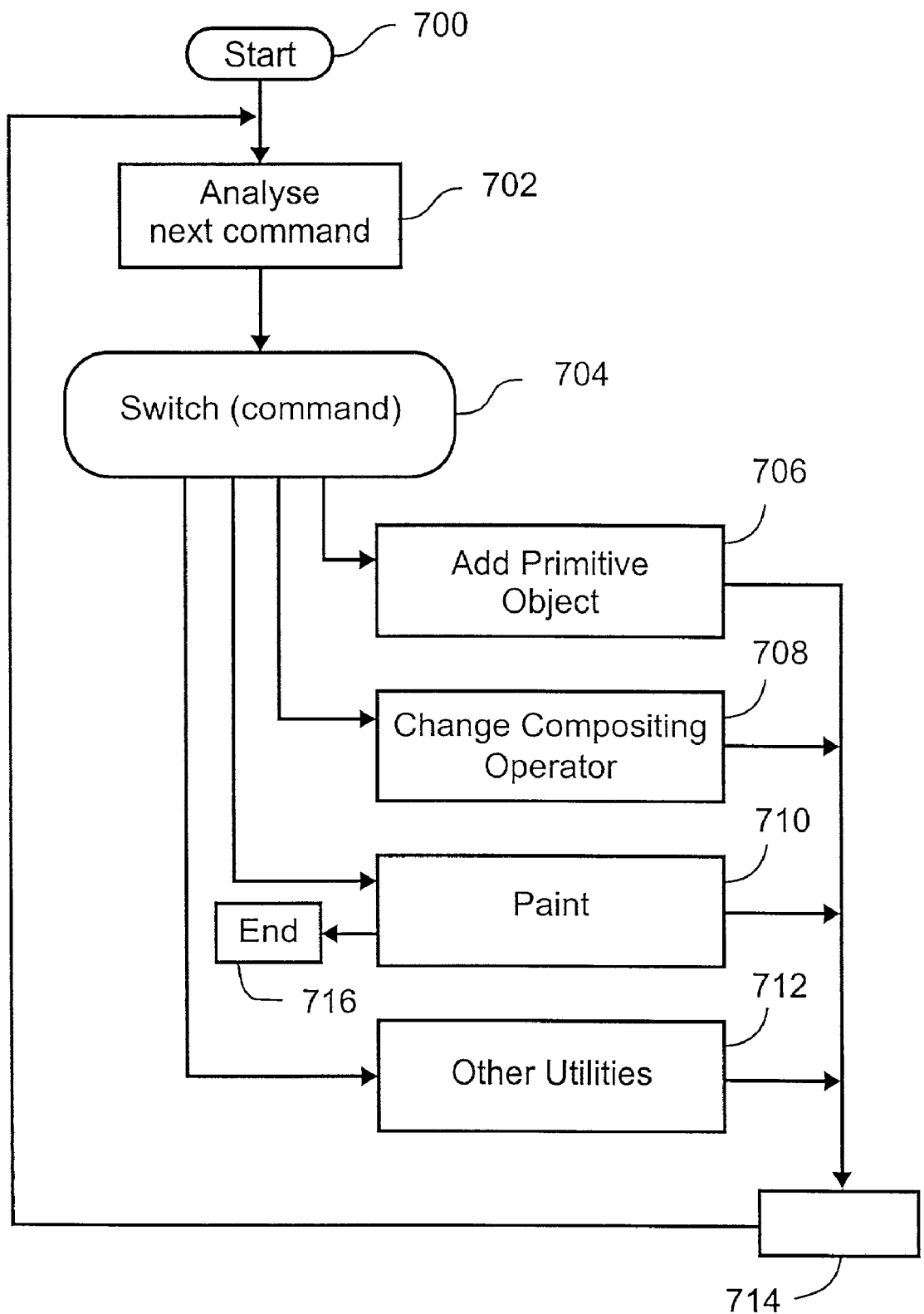
FIG. 7 shows a flow chart of another procedure for generating one or more sets of rendering instructions used by the render instruction generator of FIG. 1A.

Turning now to FIG. 7, there is shown a flow chart of an alternative procedure for generating one or more sets of rendering instructions used by the render instruction generator of FIG. 1A. This alternative procedure differs from the procedure shown in FIGS. 3(a) and 3(b) in that the alternative procedure is able to handle composite objects comprising multiple primitive objects combined together using compositing operators in one single z-layer. That is, the group of composited primitive objects is considered for the purposes of Painter's Algorithm to be a single z-layer, wherein the composited objects are combined using compositing operators and/or structures that are not compatible with Painter's Algorithm. Thus, the group of composited primitive objects is treated as indivisible from the point of view of layering. This means that all the components of a composited object must be received before the object can be added to the current set of render instructions. This slightly changes the procedure for generating one or more sets of rendering instructions as previously described with reference to FIGS. 3(a) and 3(b) as will be apparent. However, there are many steps in common in both these procedures and for ease of understanding these steps are referenced by the same reference numerals.

On the other hand, the procedure described with reference to FIGS. 3(a) and 3(b) is able to handle only one single primitive object per z-layer. As this procedure requires only one primitive object per z-layer, the operations of receiving a primitive object and "Painting" the object into the render instruction queue (step 314) can be a sequential operation. This means the object data does not need to be stored before converting to render instructions. However, in the alternate procedure multiple primitive objects can be processed per z-layer. So the object data and associated composited operations need to be stored as they are received. When all primitive objects contributing to the z-layer have been received they are then "Painted" (step 314) into the set of current render instructions together in one go.

Returning to FIG. 7, the alternative procedure for generating one or more sets of rendering instructions will now be described in more detail. The render instruction generator 109 is started 700 and initialised for each single printed page. The alternative procedure then processes 702 the next command of the page description in accordance with the page description language (eg PostScript™). The alternative procedure then tests 704 whether the command is one of several types, and the alternative procedure then proceeds to either one of four different sub-procedures 706, 708, 710, and 712 depending upon the command type. A switch type statement can perform this multiple branching in flow control.

The sub-procedure 706 is activated when the command type is for adding a primitive object. As would be apparent, an arbitrary number of primitive objects can be received, and added to the composited object being constructed. The sub-procedure 708 is activated when the command type is for changing the compositing operator. Again, an arbitrary number of primitive compositing operators can be set for constructing the composited object. The sub-procedure 710 is activated when the construction of the composited object is complete. This sub-procedure 710 can be activated on the command type as the commands within the z-layer are not compatible with Painter's Algorithm. The sub-procedure 712 is activated when command type is for other utilities to be activated. Such utilities may include clipping, diagnostics, render mode adjustment and so forth.

These four sub-procedures return via 714 to step 702, where the next command of the page description is processed 702. The alternative procedure terminates at step 716 after the final completion of the paint sub-procedure 710.

Figure 8A:
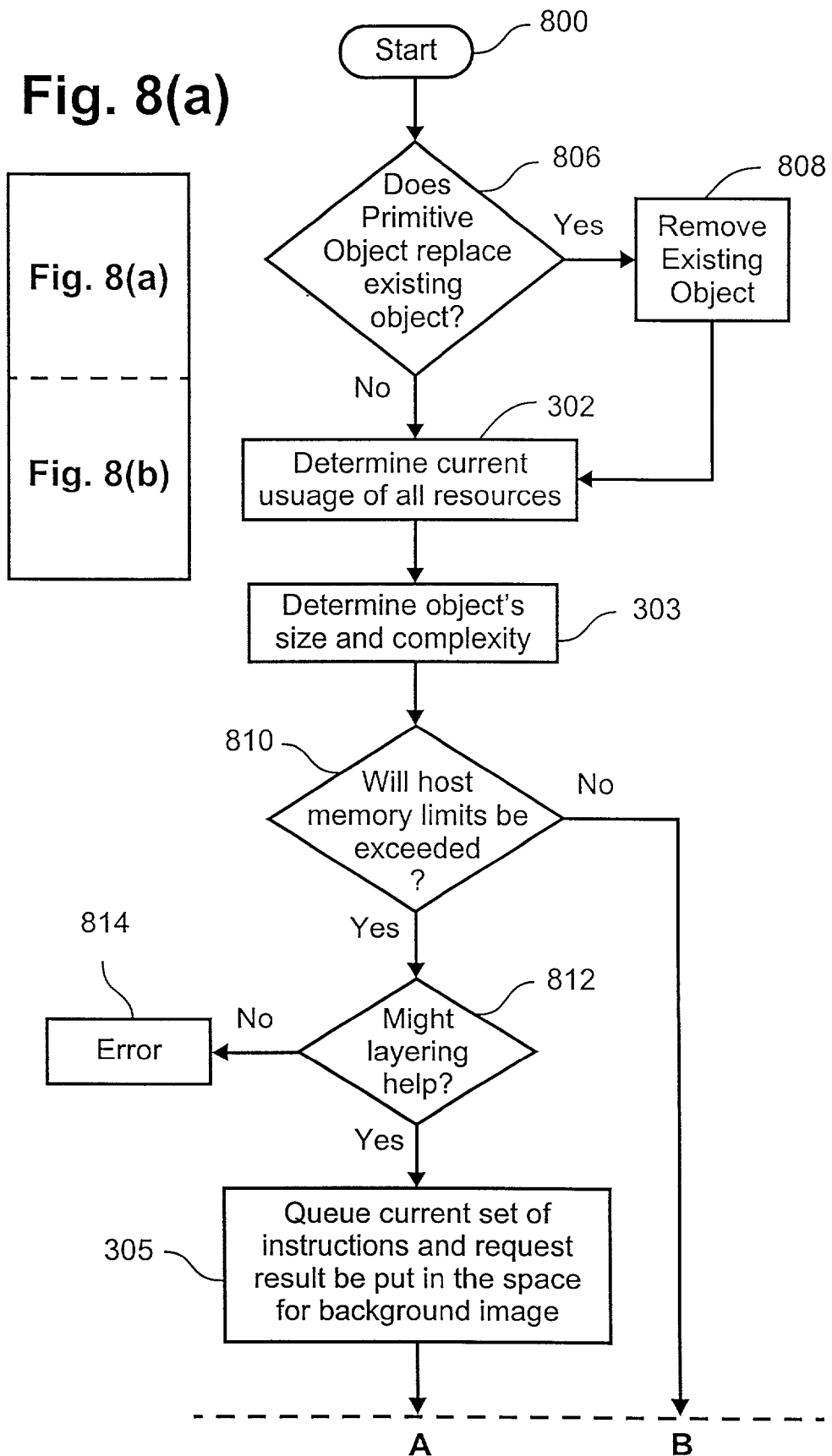
FIGS. 8(a) and 8(b) show a flow chart of the sub-procedure for adding a primitive object used in the procedure shown in FIG. 7.
Figure 8B:
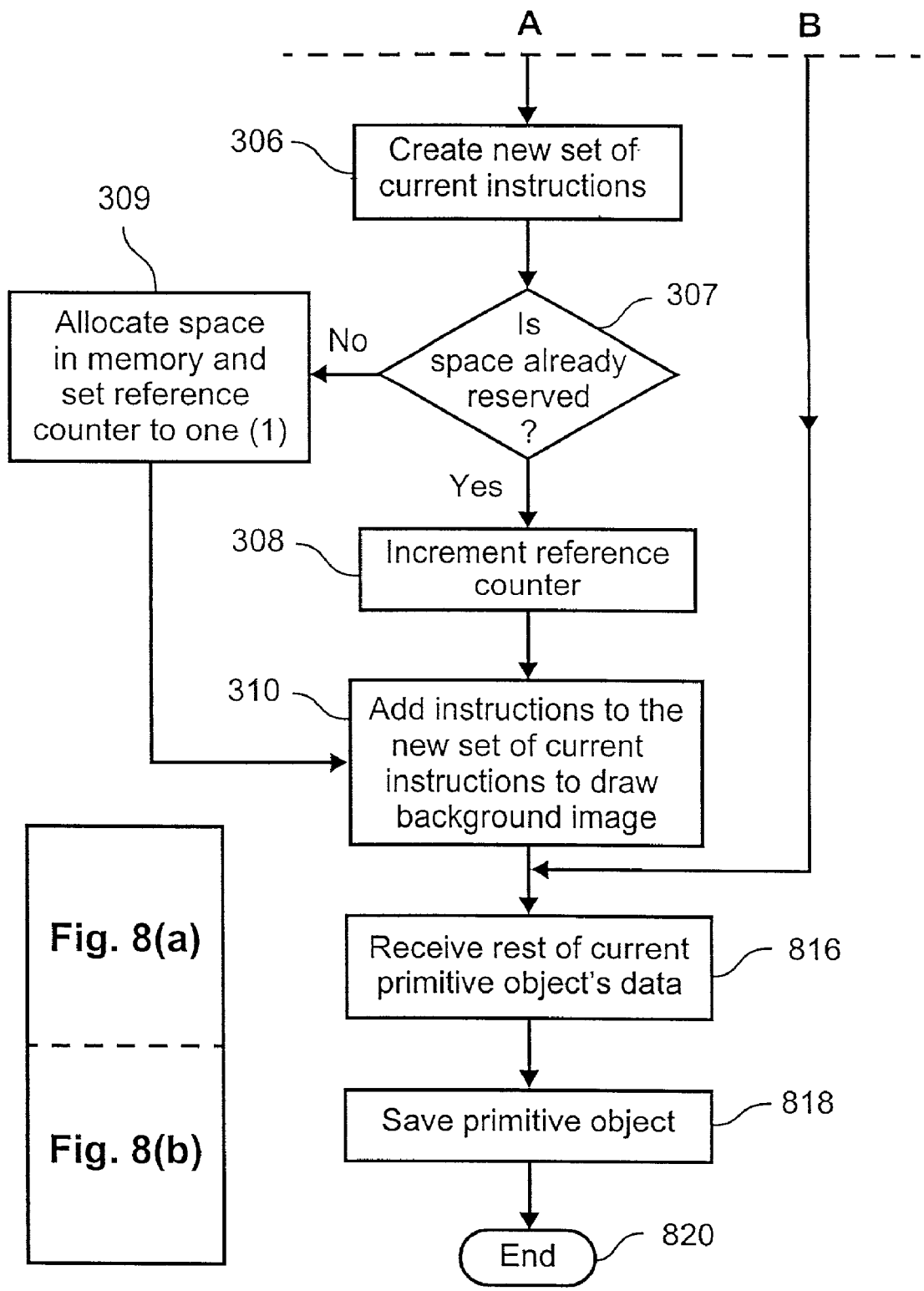

Turning now to FIGS. 8(*a*) and 8(*b*), there is now described in more detail the sub-procedure 706 for adding a primitive object used in the procedure shown in FIG. 7. The sub-procedure 706 for adding a primitive object commences at step 800 where basic information concerning the primitive object is retrieved. The sub-procedure 706 proceeds to decision block 806, where a check is made whether or not the current primitive object is to replace an existing object. If the decision block 806 returns TRUE(YES), the primitive object is replaced 808 within the composited object. For example, the composited object may be using a ROP4 operator. This takes operands of Source, Pattern and Mask. The Source, Pattern or Mask may be replaced several times before the final combination to be painted is known. If a primitive object is being replaced, it is removed (808) as it no longer contributes to the cumulative resources for the composite object. Next, at step 302, the sub-procedure 706 obtains the current usage of all render and system resources utilised by the set of current render instructions in similar fashion as that described with reference to FIGS. 3(*a*) and 3(*b*). The sub-procedure 706 then proceeds to step 303, where it retrieves enough information about the next primitive object in the page description to determine the primitive object's complexity and size. The manner in which this is determined is similar to that described with reference to the preferred procedure shown in FIGS. 4(*a*) and 4(*b*).

Next, at decision block 810, a check is made whether adding this primitive object would exhaust the host memory limits. If the host memory limits would not be exhausted the sub-procedure 706 proceeds to step 816. If the host memory limits would be exceeded, then sub-procedure 706 tests at decision block 812 whether layering might help. Layering might help if there are already exists objects in the current set of render instructions which, when rendered into a background layer, will free up host memory. If layering will not free up memory, then the sub-procedure 706 returns with an error 814 signal of "object too complex". On the other hand, if layering might help, the sub-procedure 706 proceeds to steps 305 to 310 (FIG. 8(*a*) and 8(*b*)). The operation of these steps 305 to 310 (FIG. 8(*a*) and 8(*b*)) is substantially the same as that described above with reference to steps 305 to 310 of FIGS. 3(*a*) and 3(*b*) and will not be described further.

After step 310 (FIG. 8(*b*)) or when the decision block 810 (FIG. 8(*a*)) returns False (No), the sub-procedure 706 proceeds to step 816 where the rest of the primitive object's data is received. Note that in this alternative procedure, it is possible for this step to fail. It is possible that there will be insufficient host memory to receive the primitive object. If there is insufficient host memory, even after waiting for the render instruction queue to be completely empty, this embodiment returns an "object too complex" error. If there was sufficient host memory, the primitive object is saved 818, along with its complexity information, the current compositing operator, and any other relevant information. The sub-procedure 706 then terminates 820 and returns to step 702 via 714 for the next command.

Figure 9:
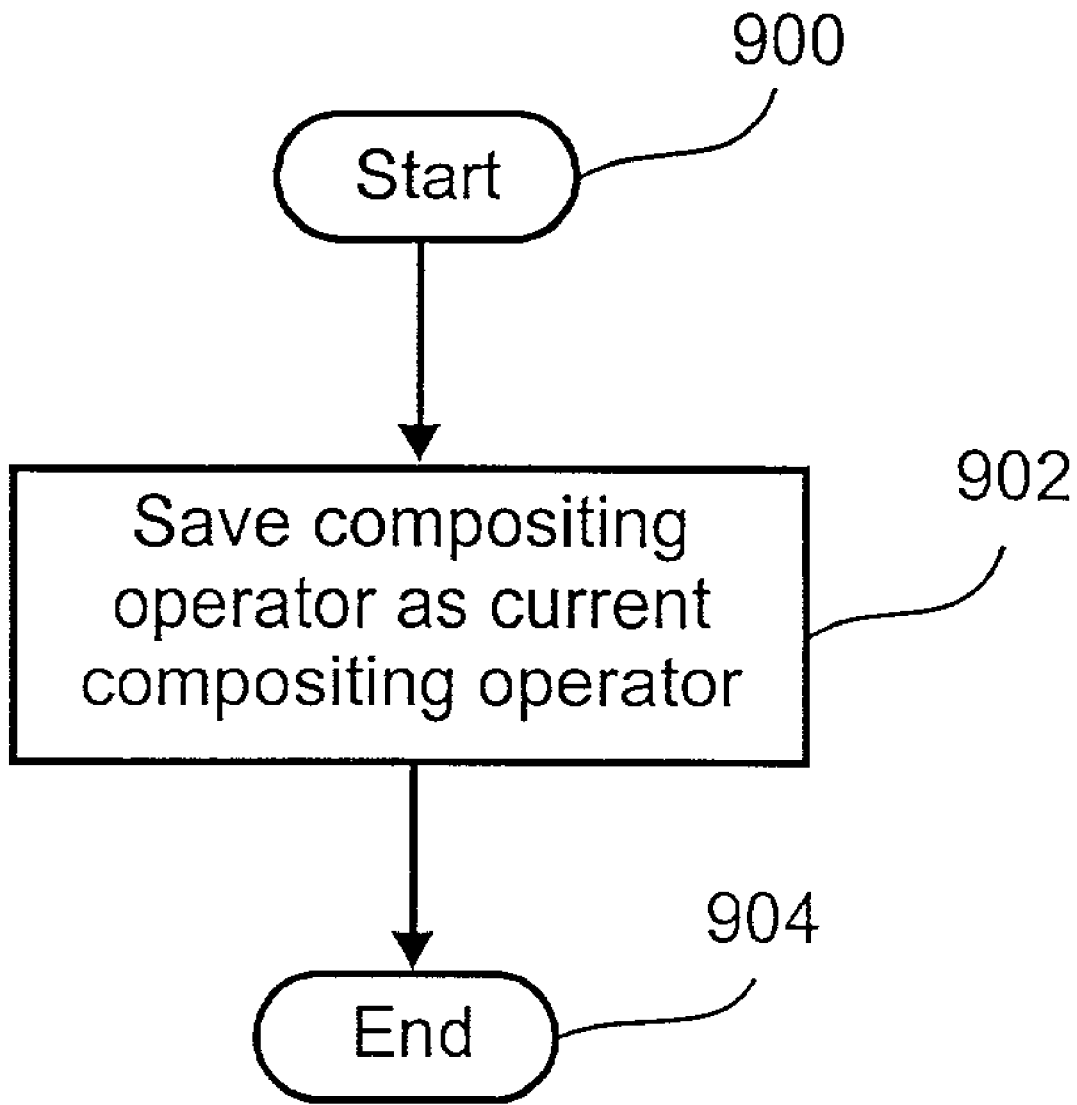
FIG. 9 shows a flow chart of the sub-procedure for changing the compositing operator used in the procedure shown in FIG. 7.

Turning now to FIG. 9, there is shown a flow chart of the sub-procedure 708 for changing the compositing operator used in the procedure shown in FIG. 7. The subprocedure 708 commences at step 900 where the compositing operator is retrieved. The type of compositing operator retrieved depends upon the type of command processed in step 702. This compositing operator is then saved as the current compositing operator. The sub-procedure 708 then terminates 904 and returns to step 702 via 714 for the next command.

Figure 10A:
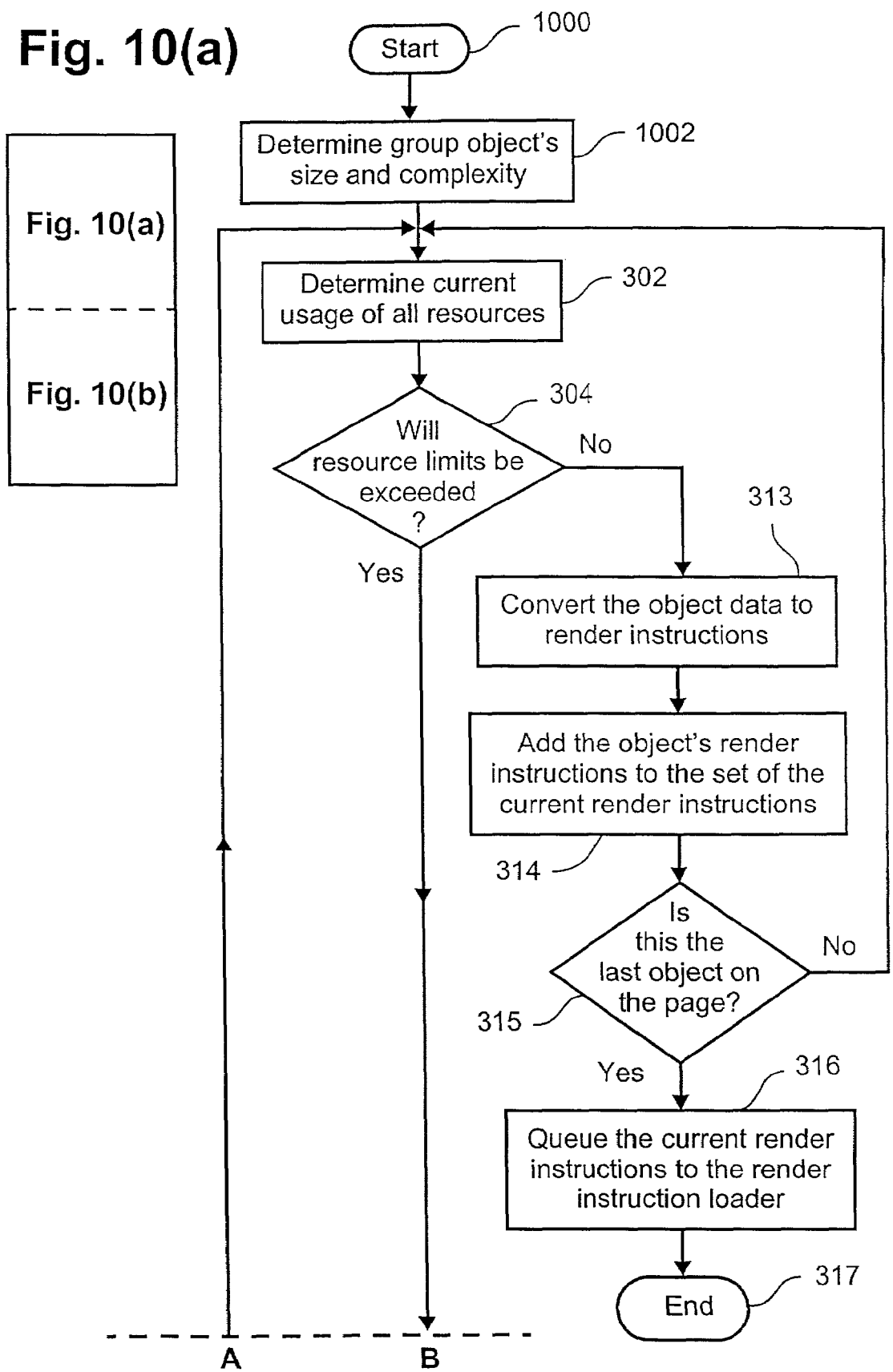
FIGS. 10(a) and 10(b) show a flow chart of the sub-procedure for painting used in the procedure shown in FIG. 7.
Figure 10B:
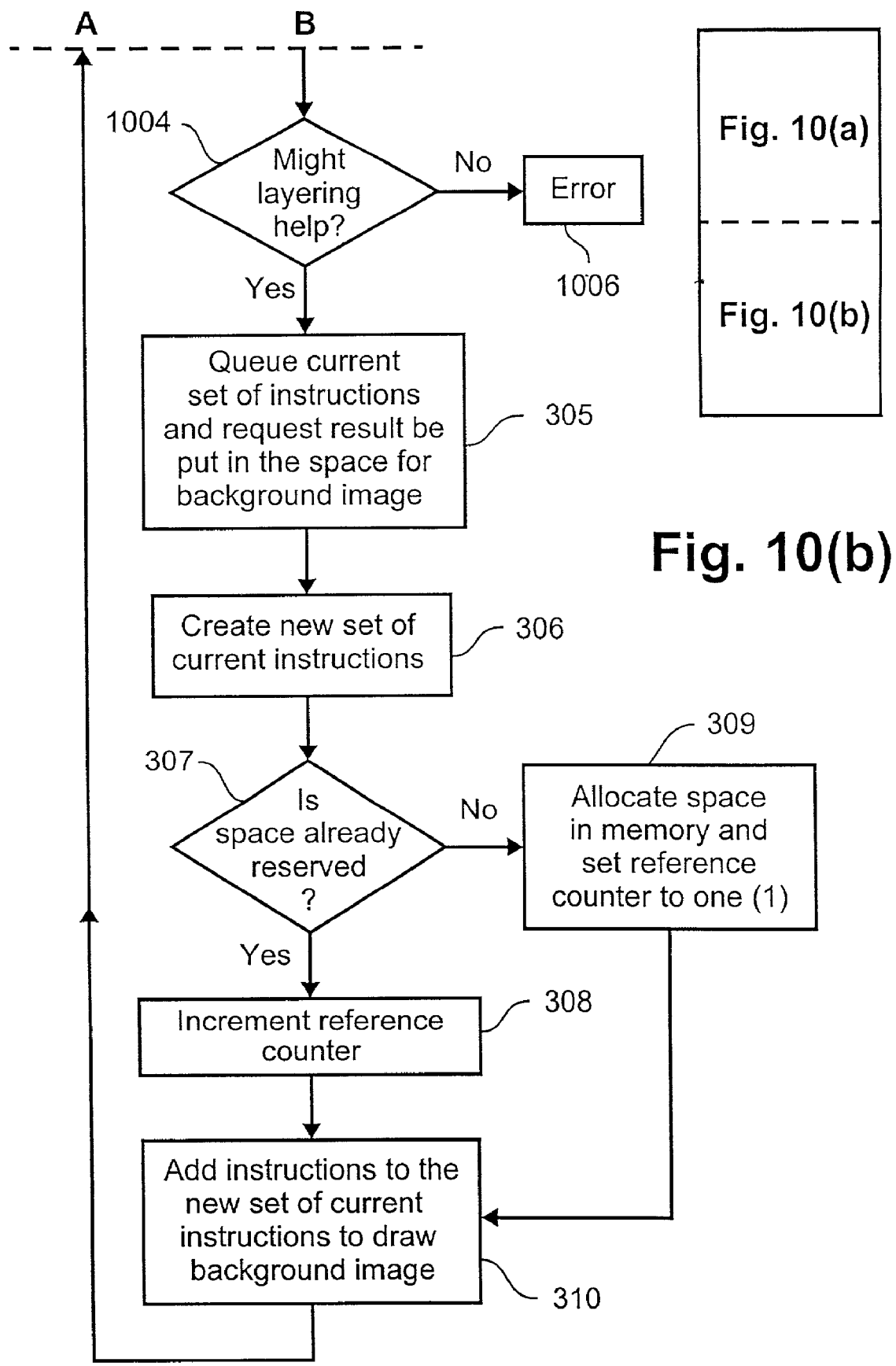

Turning now to FIGS. 10(*a*) and 10(*b*), there is shown a flow chart of the sub-procedure 710 for painting used in the procedure shown in FIG. 7. This sub-procedure 710 commences when the command processed in step 702 is compatible with Painter's algorithm. When this occurs, the group of primitive objects previously received and stored by the sub-procedures 706 and 708 currently being constructed is complete. The sub-procedure 710 firstly determines 1002 the size and complexity of the constructed group of primitive objects. This is the sum of the known size and complexity of each of the component primitive objects, plus possibly some additional resource usage. For example, in an implementation it may require additional levels to composite the primitive objects together. Then the sub-procedure 710 determines the current usage of all resources, in a similar fashion to step 302 (FIG. 3(*a*)). The sub-procedure then proceeds to a decision block 304, where a check is made whether or not the resource limits will be exceeded, in a similar fashion to decision block 304 (FIG. 3(*a*)). If the decision block 304 returns False (No) the sub-procedure proceeds to step 313. On the other hand, if the decision block 304 returns True (Yes), the sub-procedure proceeds to decision block 1004 where a check is made whether or not layering might help. If the decision block 1004 determines layering will not help, then the sub-procedure returns 1006 an error signal of "object too complex". If the decision block 1004 determines layering may help, the subprocedure 710 proceeds to steps 305 to 310 (FIG. 10(*b*)). The operation of these steps 305 to 310 (FIG. 10(*b*)) is substantially the same as that described above with reference to steps 305 to 310 of FIGS. 3(*a*) and 3(*b*) and will not be described further. After step 310, the sub-procedure 710 proceeds to step 302.

If the decision block 304 (FIG. 10(*a*)) returns false, the sub-procedure proceeds to step 313 where the object data is converted into render instructions, which is an intermediate data form of the page description and then adds 314 these converted render instructions to the set of the current render instructions.

After step 314, the sub-procedure 710 proceeds to decision block 315. In decision block 315, a check is made whether the current group of primitive objects is the last group of primitive objects on the page. If the decision block 315 returns TRUE (YES), the set of current render instructions are queued (step 316) on the instruction queue 112 for subsequent loading by the render instruction loader 110. The sub-procedure 710 terminates 317 and the alternative procedure then terminates 716. If the decision block 315 returns FALSE (NO), the sub-procedure 710 returns to step 302 to receive the next group of primitive objects, where the process starts again for the next group of primitive objects.

In this way, arbitrarily complex constructed objects can be rendered. However, layering can only be done where z ordering applies. So the entire composited object must fit into host memory at one time, and it must also fit within one layer (both memory and complexity-wise), for the composited object to be able to be rendered within the fixed memory and fixed resource environment. Practically speaking, using conventional page description languages, objects are rarely so complex that they cannot be rendered.

As mentioned above, the instruction queue and render instruction loader can be dispensed with. In these cases there is only one set of rendering instructions and there is no need for a queue. The instruction generator will again test if available resources would be exceeded if the received object is added to the current set of rendering instructions. If the resources would be exceeded, the instruction generator instructs the render engine to render the current set (not including the current received object) onto the reserved space in memory (frame store) of the background image and then sets the current render-list to empty. This empty set of current rendering instructions however may contain basic render initialisation instructions. If the resources would not be exceeded, the instruction generator does not alter the current set of rendering instructions. The instruction generator then adds the received object to the current set of rendering instructions. If the received object is the last object in the z-order and if said frame-store was rendered onto, the instruction loader requests the render engine to render the current set of rendering instructions in combination with said frame-store to form the rendered page description. On the other hand, if the received object is the last object in the z-order and if the frame store was not rendered onto the instruction loader requests the render engine to render the current set to form the rendered page description.

The aforementioned preferred method(s) comprise a particular control flow. There are many other variants of the preferred method(s) which use different control flows without departing the spirit or scope of the invention: Furthermore one or more of the steps of the preferred method(s) may be performed in parallel rather than sequential. The aforementioned preferred method(s) may be implemented as a computer program, which may be stored on a computer readable medium. The steps of the method can be implemented as program code for instructing the host processor to perform the functions of those steps.

INDUSTRIAL APPLICABILITY

It is apparent from the above that the embodiments of the invention are applicable to the computer graphics and printing industries.

The foregoing describes only some embodiments of the present invention, and modifications and/or changes can be made thereto without departing from the scope and spirit of the invention, the embodiment(s) being illustrative and not restrictive. For example, the preferred embodiment may be adapted for use in rendering to a display screen.

We claim:

1. A method of rendering a page description on a rendering system, wherein said page description comprises one or more objects, the method comprising the steps of:
   (a) receiving said objects sequentially in z-order from bottom to top;
   (b) generating one or more sets of render instructions for the received objects, wherein said generating step performs the following sub-steps for each received object:
      (ba) determining whether adding corresponding render instructions of a current received object to a current set of render instructions would exceed the resources of the rendering system; and
      (bb) if the resources would be exceeded, performing the sub-steps of:
         (bba) creating a new set of render instructions;
         (bbb) adding render instructions to the new set of render instructions to draw the current set of render instructions as a background image comprising a single object corresponding to the objects having render instructions in the current set of render instructions; and
         (bbc) adding to the new set of render instructions the corresponding render instructions of said current received object; and
      (bc) if the resources would not be exceeded, performing the sub-step of:
         (bca) adding the corresponding render instructions of said current received object to the current set of instructions; and
   (c) rendering said one or more sets of rendering instructions as pixel data.

2. A method as claimed in claim 1, wherein if the resources would be exceeded, the method comprises the further sub-step of:
   queuing said current set of rendering instructions and requesting that the pixel data of the rendering of said current set of rendering instructions be stored in a space reserved in memory for said background image.

3. A method as claimed in claim 1, wherein if the resources would be exceeded, the method comprises the further sub-steps of:
   queuing said current set of rendering instructions and requesting that the pixel data of the rendering of said current set of rendering instructions be stored in a space reserved in memory for said background image; and
   allocating said space in memory for said background image, if not previously allocated.

4. A method as claimed in claim 1, wherein if the resources would not be exceeded and if the current received object is the last object in the z-order, the method comprises the further sub-step of:
   queuing said current set of rendering instructions.

5. A method as claimed in claim 1, wherein said generating step further comprises the sub-step of:
   converting the current received object to corresponding rendering instructions.

6. A method as claimed in claim 1, wherein said rendering step comprises the sub-steps of:
   (ca) determining whether pixel data output from the execution of said current set of rendering instructions to be stored in a space reserved in memory for said background image; and
   (cb) if the pixel data output from the execution of the current set of rendering instructions to be stored in the space reserved in the memory for said background image, performing the sub-step of:
      (cba) rendering the current set of rendering instructions as said background image; and (cbb) storing said background image in the space reserved in the memory; and (cc) if the pixel data output from the execution of the current set of rendering instructions not to be stored in the space reserved in the memory for said background image performing the sub-step of:

(cd) rendering the current set of rendering instructions to an output device.

7. A method as claimed in claim 6, wherein said output device is a printer.

8. A method as claimed in claim 6, wherein said output device is a display screen.

9. A method as claimed in claim 6, wherein if the pixel data output from the execution of the current set of rendering instructions to be stored in the space reserved in the memory for said background image, performing the further sub-step of:

compressing the background image prior to storage in the space reserved in the memory.

10. A method as claimed in claim 1, wherein one or more of said one or more objects comprise a group of a plurality of primitive objects.

11. A system for rendering a page description, wherein said page description comprises one or more objects, said system comprising:

means for receiving said objects sequentially in z-order from bottom to top;

means for generating one or more sets of render instructions for the received objects, wherein said generating means comprises:

(i) means for determining, for each received said object, whether adding corresponding render instructions of a current received object to a current set of render instructions would exceed the resources of the rendering system;

(ii) means for creating, if the resources would be exceeded, a new set of render instructions;

(iii) means for adding, if the resources would be exceeded, render instructions to the new set of render instructions to draw the current set of render instructions as a background image comprising a single object corresponding to the objects having rendering instructions in the current set of render instructions;

(iv) means for adding, if the resources would be exceeded, to the new set of render instructions the corresponding render instructions of said current received object;

(v) means for adding, if the resources would not be exceeded, the corresponding render instructions of said current received object to the current set of instructions; and (vi) means for rendering said one or more sets of rendering instructions as pixel data.

12. A system as claimed in claim 11, wherein said generating means further comprises:

means for queuing, if the resources would be exceeded, said current set of rendering instructions and requesting that the pixel data of the rendering of said current set of rendering instructions be stored in a space reserved in memory for said background image.

13. A system as claimed in claim 11, wherein said generating means further comprises:

means for queuing, if the resources would be exceeded, said current set of rendering instructions and requesting that the pixel data of the rendering of said current set of rendering instructions be stored in a space reserved in memory for said background image; and means for allocating, if the resources would be exceeded, said space in memory for said background image, if not previously allocated.

14. A system as claimed in claim 11, wherein said generating means further comprises:

means for queuing, if the resources would not be exceeded and if the current received object is the last object in the z-order, said current set of rendering instructions.

15. A system as claimed in claim 11, wherein said generating means further comprises:

means for converting the current received object to corresponding rendering instructions.

16. A system as claimed in claim 11, wherein said rendering means comprises:

means for determining whether pixel data output from the execution of said current set of rendering instructions to be stored in a space reserved in memory for said background image;

means for rendering, if the pixel data output from the execution of the current set of rendering instructions to be stored in the space reserved in the memory for said background image, the current set of rendering instructions as said background image;

means for storing said rendered background image in the space reserved in the memory; and means for rendering, if the pixel data output from the execution of the current set of rendering instructions not to be stored in the space reserved in the memory for said background image, the current set of rendering instructions to an output device.

17. A system as claimed in claim 16, wherein said output device is a printer.

18. A system as claimed in claim 16, wherein said output device is a display screen.

19. A system as claimed in claim 16, wherein said rendering means further comprises:

means for compressing, if the pixel data of the current set of rendering instructions are to be stored in the space reserved in the memory for said background image, the background image prior to storage in the space reserved in the memory.

20. A computer readable medium comprising a computer program for controlling the operation of a computer on which the computer program executes to perform a method of rendering a page description, wherein said page description comprises one or more objects, the method comprising:

(i) receiving said objects sequentially in z-order from bottom to top;

(ii) generating one or more sets of render instructions for the received objects, wherein said generating step comprises:

(ii-i) determining, for each received said object, whether adding corresponding render instructions of a current received object to a current set of render instructions would exceed the resources of the rendering system;

(ii-ii) creating, if the resources would be exceeded, a new set of render instructions;

(ii-iii) adding, if the resources would be exceeded, render instructions to the new set of render instructions to draw the current set of render instructions as a background image comprising a single object corresponding to the object having render instructions in the current set of render instructions;

(ii-iv) adding, if the resources would be exceeded, to the new set of render instructions the corresponding render instructions of said current received object;

(ii-v) adding, if the resources would not be exceeded, the corresponding render instructions of said current received object to the current set of instructions; and (iii) rendering said one or more sets of rendering instructions as pixel data.

* * * * *

UNITED STATES PATENT AND TRADEMARK OFFICE
CERTIFICATE OF CORRECTION

| | |
|---|---|
| PATENT NO. | : 7,084,878 B2 |
| APPLICATION NO. | : 09/905947 |
| DATED | : August 1, 2006 |
| INVENTOR(S) | : Marija Herceg et al. |

It is certified that error appears in the above-identified patent and that said Letters Patent is hereby corrected as shown below:

<u>COLUMN 17</u>:

Line 60, "are already exists" should read --already exist--.

<u>COLUMN 19</u>:

Line 48, "invention:" should read --invention.--.

Signed and Sealed this

Twenty-fifth Day of December, 2007

JON W. DUDAS
*Director of the United States Patent and Trademark Office*